United States Patent
Watts et al.

(10) Patent No.: US 10,801,310 B2
(45) Date of Patent: Oct. 13, 2020

(54) USING GASES AND HYDROCARBON RECOVERY FLUIDS CONTAINING NANOPARTICLES TO ENHANCE HYDROCARBON RECOVERY

(71) Applicants: Nissan Chemical America Corporation, Houston, TX (US); Linde AG, Munich (DE)

(72) Inventors: Robin Watts, Smithville, TX (US); Kevin Watts, Spring, TX (US); John Edmond Southwell, Glen Ellyn, IL (US); David Holcomb, Florence, AZ (US); Naveed Aslam, Bellaire, TX (US); Yusra Khan Ahmad, Friendswood, TX (US)

(73) Assignees: Nissan Chemcial America Corporation, Houston, TX (US); Messer Industries USA, Inc., Wilmington, DE (US)

( * ) Notice: Subject to any disclaimer, the term of this patent is extended or adjusted under 35 U.S.C. 154(b) by 0 days.

(21) Appl. No.: 16/141,824

(22) Filed: Sep. 25, 2018

(65) Prior Publication Data

US 2019/0093462 A1 Mar. 28, 2019

Related U.S. Application Data

(60) Provisional application No. 62/563,415, filed on Sep. 26, 2017, provisional application No. 62/697,321, filed on Jul. 12, 2018.

(30) Foreign Application Priority Data

Oct. 3, 2017 (EP) .................................... 17194608
Jul. 18, 2018 (GB) ................................... 1811749.9

(51) Int. Cl.
*E21B 43/16* (2006.01)
*E21B 43/26* (2006.01)
(Continued)

(52) U.S. Cl.
CPC .............. *E21B 43/168* (2013.01); *C09K 8/60* (2013.01); *C09K 8/62* (2013.01); *E21B 43/164* (2013.01);
(Continued)

(58) Field of Classification Search
CPC ........ E21B 43/168; E21B 43/164; E21B 43/26
(Continued)

(56) References Cited

U.S. PATENT DOCUMENTS 3,506,070 A    4/1970  Jones
3,613,786 A   10/1971  Jones et al.
(Continued)

FOREIGN PATENT DOCUMENTS

CN    101735787 A    6/2010
CN    102838981 A    12/2012
(Continued)

OTHER PUBLICATIONS

A Search Report dated Oct. 12, 2018 in a corresponding Great Britain Application No. GB1811749.9 (3 pages).
(Continued)

*Primary Examiner* — Zakiya W Bates
*Assistant Examiner* — Ashish K Varma
(74) *Attorney, Agent, or Firm* — Nixon & Vanderhye, P.C.; Margaret Brumm; Joshua L. Cohen

(57) ABSTRACT

A process of stimulating hydrocarbon recovery is described and claimed. This process includes introducing a gas, a liquified gas or a vaporized liquified gas, into an underground formation containing hydrocarbons such as crude oil and gas, permitting said gas to be absorbed by said hydrocarbons, and withdrawing said hydrocarbons containing the gas therein, wherein a pill of Hydrocarbon Recovery Fluid comprising surface functionalized nanoparticles is inserted into the underground formation containing hydrocarbons
(Continued)

before, during or after the introduction of the gas, liquified gas or a vaporized liquified gas.

14 Claims, 6 Drawing Sheets

(51) Int. Cl.
*C09K 8/60* (2006.01)
*C09K 8/62* (2006.01)
C09K 8/594 (2006.01)
(52) U.S. Cl.
CPC .............. *E21B 43/26* (2013.01); *C09K 8/594* (2013.01); *C09K 2208/10* (2013.01)
(58) Field of Classification Search
USPC ...................................................... 166/308.2
See application file for complete search history.

(56) References Cited

U.S. PATENT DOCUMENTS

| | | | |
|---|---|---|---|
| 3,623,553 A | 11/1971 | Burdge | |
| 3,740,343 A | 6/1973 | Jones | |
| 3,885,628 A | 5/1975 | Reed et al. | |
| 3,981,361 A | 9/1976 | Healy | |
| 4,240,504 A | 12/1980 | Reed | |
| 4,328,106 A * | 5/1982 | Harrar | C02F 5/14 210/700 |
| 4,348,462 A | 9/1982 | Chung | |
| 4,390,068 A | 6/1983 | Patton et al. | |
| 4,892,146 A * | 1/1990 | Shen | C09K 8/588 166/270.1 |
| 5,168,082 A | 12/1992 | Matchett et al. | |
| 5,381,863 A * | 1/1995 | Wehner | E21B 43/164 166/268 |
| 6,863,985 B2 | 3/2005 | Stark et al. | |
| 7,033,975 B2 * | 4/2006 | Baran, Jr. | B82Y 30/00 166/268 |
| 7,101,616 B2 * | 9/2006 | Arney | C03C 17/007 264/109 |
| 7,216,712 B2 | 5/2007 | Dalton | |
| 7,380,606 B2 | 6/2008 | Pursley et al. | |
| 7,482,310 B1 | 1/2009 | Reese et al. | |
| 7,544,726 B2 | 6/2009 | Greenwood | |
| 7,553,888 B2 | 6/2009 | Greenwood et al. | |
| 8,101,812 B2 | 1/2012 | Fan et al. | |
| 8,272,442 B2 | 9/2012 | Fan et al. | |
| 8,404,107 B2 | 3/2013 | Fan et al. | |
| 8,522,876 B2 | 9/2013 | Fan et al. | |
| 8,685,234 B2 | 4/2014 | Fan et al. | |
| 9,068,108 B2 | 6/2015 | Hill et al. | |
| 9,181,468 B2 | 11/2015 | Fan et al. | |
| 9,321,955 B2 | 4/2016 | Hill et al. | |
| 9,428,683 B2 | 8/2016 | Hill et al. | |
| 9,464,223 B2 | 10/2016 | Champagne et al. | |
| 9,505,970 B2 | 11/2016 | Vaughn et al. | |
| 9,512,352 B2 | 12/2016 | Roddy et al. | |
| 9,708,525 B2 | 7/2017 | Suresh et al. | |
| 9,725,999 B2 | 8/2017 | Castrogiovanni et al. | |
| 9,790,414 B2 | 10/2017 | Champagne et al. | |
| 9,850,418 B2 | 12/2017 | Champagne et al. | |
| 9,868,893 B2 | 1/2018 | Saboowala et al. | |
| 9,884,988 B2 | 2/2018 | Dismuke et al. | |
| 10,113,406 B1 | 10/2018 | Gomaa et al. | |
| 10,160,682 B2 * | 12/2018 | Mehta | B01D 61/04 |
| 10,377,942 B2 | 8/2019 | Southwell et al. | |
| 10,557,078 B2 | 2/2020 | Southwell | |
| 10,563,117 B2 | 2/2020 | Southwell et al. | |
| 10,570,331 B2 | 2/2020 | Southwell et al. | |
| 10,570,715 B2 | 2/2020 | Babcock et al. | |
| 2003/0220204 A1 | 11/2003 | Baran et al. | |
| 2004/0077768 A1 | 4/2004 | Greenwood | |
| 2004/0097600 A1 | 5/2004 | Greenwood et al. | |
| 2006/0260815 A1 | 11/2006 | Dahanayake et al. | |
| 2007/0238088 A1 | 10/2007 | Rubinsztajn et al. | |
| 2008/0289828 A1 | 11/2008 | Hutchins et al. | |
| 2010/0096139 A1 | 4/2010 | Holcomb et al. | |
| 2010/0147515 A1 | 6/2010 | Hughes et al. | |
| 2011/0220360 A1 | 9/2011 | Lindvig et al. | |
| 2012/0024530 A1 | 2/2012 | Todd et al. | |
| 2012/0168165 A1 | 7/2012 | Holcomb et al. | |
| 2012/0175120 A1 | 7/2012 | Holcomb et al. | |
| 2013/0341020 A1 | 12/2013 | Nguyen et al. | |
| 2014/0008067 A1 | 1/2014 | Roddy et al. | |
| 2014/0116695 A1 | 5/2014 | Maghrabi et al. | |
| 2014/0162911 A1 | 6/2014 | Monastiriotis et al. | |
| 2014/0284053 A1 | 9/2014 | Germack | |
| 2014/0332218 A1 | 11/2014 | Castrogiovanni et al. | |
| 2014/0338906 A1 | 11/2014 | Monastiriotis et al. | |
| 2014/0338911 A1 | 11/2014 | Dismuke et al. | |
| 2014/0374095 A1 | 12/2014 | Ladva et al. | |
| 2015/0068744 A1 | 3/2015 | Welton et al. | |
| 2015/0068755 A1 | 3/2015 | Hill et al. | |
| 2015/0218435 A1 | 8/2015 | Suresh et al. | |
| 2015/0268370 A1 | 9/2015 | Johnston et al. | |
| 2015/0292308 A1 | 10/2015 | Conway | |
| 2016/0017204 A1 | 1/2016 | Hill et al. | |
| 2016/0137907 A1 | 5/2016 | Vo et al. | |
| 2016/0194550 A1 | 7/2016 | Hill et al. | |
| 2016/0362594 A1 | 12/2016 | Rojas et al. | |
| 2016/0369158 A1 * | 12/2016 | Patino | C09K 8/032 |
| 2017/0306219 A1 | 10/2017 | Quintero et al. | |
| 2018/0291255 A1 | 10/2018 | Southwell | |
| 2018/0291261 A1 | 10/2018 | Southwell et al. | |
| 2019/0078015 A1 | 3/2019 | Southwell et al. | |
| 2019/0078016 A1 | 3/2019 | Southwell et al. | |
| 2019/0093462 A1 | 3/2019 | Watts et al. | |
| 2019/0136123 A1 | 5/2019 | Holcomb et al. | |
| 2019/0225871 A1 | 7/2019 | Southwell | |
| 2019/0382645 A1 | 12/2019 | Southwell et al. | |
| 2020/0123435 A1 | 4/2020 | Southwell | |

FOREIGN PATENT DOCUMENTS

| | | |
|---|---|---|
| CN | 106085401 A | 11/2016 |
| EP | 1509676 | 3/2005 |
| EP | 1818693 A1 | 8/2007 |
| EP | 2465911 A1 | 6/2012 |
| JP | H01-035157 | 7/1989 |
| JP | H01234468 A | 9/1989 |
| JP | H03 31380 | 2/1991 |
| JP | H05-086989 | 12/1993 |
| JP | H10111544 A | 4/1998 |
| JP | 2004150859 A | 5/2004 |
| JP | 4033970 B2 | 1/2008 |
| JP | 5026264 B2 | 9/2012 |
| KR | 10-1872020 | 6/2018 |
| WO | WO 1995/011280 A1 | 4/1995 |
| WO | WO 2003/100214 A1 | 12/2003 |
| WO | WO 2005018300 A2 | 3/2005 |
| WO | WO 2009044912 A1 | 4/2009 |
| WO | WO 2010/103020 A1 | 9/2010 |
| WO | WO 2013192634 A2 | 12/2013 |
| WO | WO 2014/153102 A1 | 9/2014 |
| WO | WO 2014176188 A1 | 10/2014 |
| WO | WO 2014/201367 A1 | 12/2014 |
| WO | WO 2014/204709 A2 | 12/2014 |
| WO | WO 2016/040742 | 3/2016 |
| WO | WO 2016/205289 | 12/2016 |
| WO | WO 2017011328 A1 | 1/2017 |
| WO | WO 2017/023665 | 2/2017 |
| WO | WO 2017062086 A1 | 4/2017 |
| WO | WO 2018/004560 A1 | 1/2018 |
| WO | WO 2018/157099 | 8/2018 |
| WO | WO 2018187550 A1 | 10/2018 |
| WO | WO 2018187563 A1 | 10/2018 |
| WO | WO 2019054414 A1 | 3/2019 |

OTHER PUBLICATIONS

Alomair et al., SPE International, SPE-171539-MS, Society of Petroleum Engineers (2014).

(56) References Cited

OTHER PUBLICATIONS

Carpenter, JPT, 75-77 (Feb. 2018).
EPA, "Method 180.1: Determination of Turbidity by Nephelometry", Rev. 2.0 (Aug. 1993).
Farooqui et al., SPE International, SPE-174478-MS, Society of Petroleum Engineers (2015).
Li et al., SPE International, SPE-185066-MS, Society of Petroleum Engineers (2017).
Li et al., SPE International, SPE-180219-MS, Society of Petroleum Engineers (2016).
Mcelfresh et al., SPE International, SPE 154287, Society of Petroleum Engineers (2012).
Miller et al., SPE International, SPE 49169, Society of Petroleum Engineers (1998).
Palmer et al., SPE International, SPE 15497, Society of Petroleum Engineers (1986).
Shafiq et al., J Petrol Explor Prod Technol 7:1205-1216 (2017).
Syfan et al., SPE International, SPE-189876-MS, Society of Petroleum Engineers (2018).
Wang et al., J Nat Gas Sci and Eng., 35:160-174 (2016).
Wasan et al., Nature, 423:156-159 (May 2003).
Wei et al., SPE International, SPE-183871-MS, Society of Petroleum Engineers (2017).
Skauge et al., SPE International, SPE 129933, Society of Petroleum Engineers (2010).
Denney, JPT, 54-46 (Jan. 2011).
Extended European Search Report dated Jan. 8, 2018, in EP Appln. No. 18194608.0 (6 pages).
U.S. Appl. No. 15/946,252, Southwell, filed Apr. 5, 2018.
U.S. Appl. No. 15/946,338, Southwell et al., filed Apr. 5, 2018.
U.S. Appl. No. 16/129,688, Southwell et al., filed Sep. 12, 2018.
U.S. Appl. No. 16/129,705, Southwell et al., filed Sep. 12, 2018.
Office Action dated Jun. 5, 2018, in U.S. Appl. No. 15/946,338 (16 pages).
International Search Report dated Aug. 1, 2018, in International Patent Application No. PCT/US2018/026227 (15 pages).
Estephan et al., "Zwitterion-Stabilized Silica Nanoparticles: Toward Nonstick Nano", Langmuir, vol. 26, No. 22, Nov. 16, 2010; 16884-16889 (6 pages).
Bjorkegren, et al., "Hydrophilic and hydrophobic modifications of colloidal silica particles for Pickering emulsions", Journal of Colloid and Interface Science, Academic Press, Inc, US, vol. 487, 2017; 250-257.
Bjorkegren, "Functionalization and characterization of aqueous silica sols and their application in Pickering emulsions", Jan. 1, 2016, XP055492689, Retrieved from the Internet, www://publications.lib.chalmers.se/records/fulltext/246587/246587.pdf. pp. 1-34 and 7 page index (41 pages).
Bjorkegren, et a., "Surface activity and flocculation behavior of polyethylene glycol-functionalized silica nanoparticles", Journal of Colloid and Interface Science, Academic Press,Inc, US, vol. 452, Apr. 27, 2015, 215-223 (9 pages).
De Lara et al., "Functionalized Silica Nanoparticles within Multicomponent Oil/Brine Interfaces: A Study in Molecular Dynamics", Journal of Physical Chemistry C, vol. 120, No. 12, Mar. 22, 2016, 6787-6795 (9 pages).
International Search Report dated Aug. 1, 2018, in International Patent Application No. PCT/US2018/026245 (14 pages).
Brunel, "Functionalized micelle-templated silicas (MTS) and their use as catalysts for fine chemicals", Microporous and Mesoporous Materials, vol. 27, No. 2-3, Feb. 1, 1999, 329-344 (16 pages).
Non-Final Office Action dated Sep. 10, 2018, in U.S. Appl. No. 15/946,252 (10 pages).
Ju et al., "Enhanced Oil Recovery by Flooding with Hydrophilic NanoParticles", China Particuology vol. 4, No. 1, 41-46, 2006.
Goodwin et al., "Functionalization of Colloidal Silica and Silica Surfaces via Silylation Reactions", Colloid Polym Sci 268:766-777 (1990).
Zhang, et al., "Foams and Emulsions Stabilized with Nanoparticles for Potential Conformance Control Applications", SPE International Symposium on Oilfield Chemistry held in the Woodlands, Texas, USA, Apr. 20-22, 2009.
Hoelscher et al., "Application of NanoTechnology in Drilling Fluids", SPE International Oilfield Nanotechnology Conference held in Noordwijk, The Netherlands, Jun. 12-14, 2012.
Hendraningrat et al., "A Corefield Investigation of Nanofluid Enhanced Oil Recovery in Low-Medium Permeability Berea Sandstone", SPE International Symposium on Oilfield Chemistry held in the Woodlands, Texas, USA, Apr. 8-10, 2013.
Arkles, "Hydrophobicity, Hydrophilicity and Silanes", Paint & Coatings Industry Magazine, Oct. 2006.
European Search Report dated Jul. 31, 2017 in European Patent Application No. 17166435.2 (8 pages).
European Search Report dated Jul. 31, 2017 in European Patent Application No. 17166443.6 (7 pages).
European Search Report dated Jul. 31, 2017 in European Patent Application No. 17166426.1 (7 pages).
Final Office Action dated Jun. 18, 2019 in U.S. Appl. No. 16/129,688, filed Sep. 12, 2018.
Final Office Action dated Jun. 18, 2019 in U.S. Appl. No. 16/129,705, filed Sep. 12, 2018.
Notice of Allowance dated Jun. 24, 2019 in U.S. Appl. No. 15/946,338, filed Apr. 5, 2018.
Technical Data Sheet of Aerosil R972 downloaded on Jun. 12, 2019.
Amendment and Response to Office Action with Declaration Under 37 C.F.R. §1.132 filed Jan. 11, 2019 in U.S. Appl. No. 15/946,338.
Aminzadeh, B., et al., "Influence of Surface-Treated Nanoparticles on Displacement Patterns During Co Injection," SPE Annual Technical Conference and Exhibition, 20 pages (Jan. 2013).
International Search Report and Written Opinion for International Application No. PCT/JP2017/037208, European Patent Office, The Hague, dated Jun. 5, 2018, 8 pages.
International Search Report and Written Opinion for International Application No. PCT/US2018/052736, European Patent Office, The Hague, dated Dec. 12, 2018, 9 pages.
International Search Report and Written Opinion for International Application No. PCT/US2018/058954, European Patent Office, The Hague, dated Feb. 13, 2019, 12 pages.
Jurinak, J.J., et al., "Oilfield Applications of Colloidal Silica Gel," SPE Production Engineering, 6 (4):406-412 (Nov. 1991), XP055551121.
Wilson, A., "Field Trials of Reservoir Nanoparticles Reveal Stability, High Rates of Recovery," Journal of Petroleum Technology, 64 (11):92-99 (Nov. 2012).
Partial English translation of title page and claims of Chinese Publication No. 101735787 A, published Jun. 16, 2010.
Partial English translation of title page and claims of Chinese Publication No. 102838981 A, published Dec. 26, 2012.
Partial English translation of title page and claims of Chinese Publication No. 106085401 A, published Nov. 6, 2016.
English translation of the Written Opinion for International Application No. PCT/JP2018/033831, Japan Patent Office, dated Nov. 13, 2018, 6 pages.
Written Opinion for International Application No. PCT/JP2018/033831, Japan Patent Office, dated Nov. 13, 2018, 5 pages.
Sears, "Determination of Specific Surface Area of Colloidal Silica by Titration with Sodium Hydroxide," Analytical Chemistry, 28:12, pp. 1981-1983 (Dec. 1956).
English machine translation of Japanese Patent Application No. H01-035157, published Jul. 24, 1989.
English machine translation of Japanese Patent Publication No. H05-086989, published Dec. 15, 1993.
Final Office Action dated Jan. 4, 2019, in U.S. Appl. No. 15/946,252.
Non-Final Office Action dated Jan. 31, 2019, in U.S. Appl. No. 16/179,676.
Non-Final Office Action dated Feb. 27, 2019, in U.S. Appl. No. 16/129,688.
Non-Final Office Action dated Feb. 28, 2019, in U.S. Appl. No. 16/129,705.
Final Office Action dated Aug. 19, 2019, in U.S. Appl. No. 16/179,676.
Non-Final Office Action dated Jul. 12, 2019, in U.S. Appl. No. 15/946,252.
Non-Final Office Action dated Aug. 1, 2019, in U.S. Appl. No. 16/374,060.

\* cited by examiner

USING GASES AND HYDROCARBON RECOVERY FLUIDS CONTAINING NANOPARTICLES TO ENHANCE HYDROCARBON RECOVERY

CROSS REFERENCE TO RELATED PATENT APPLICATIONS

This patent application claims priority to U.S. Provisional Patent Application No. 62/563,415, filed on Sep. 26, 2017, which is hereby incorporated by reference in its entirety; claims priority to U.S. Provisional Patent Application No. 62/697,321, filed on Jul. 12, 2018, which is hereby incorporated by reference in its entirety; claims priority to European Patent Application No. 17194608.0, filed on Oct. 3, 2017; and claims priority to United Kingdom Patent Application No. 1811749.9, filed on Jul. 18, 2018.

FIELD OF THE INVENTION

The present invention relates to improved hydrocarbon recovery methods using gases such as carbon dioxide, nitrogen, natural gas, liquified natural gas, liquified carbon dioxide and/or mixtures thereof in combination with functionalized materials such as nanoparticles or mixtures of nanoparticles.

BACKGROUND OF THE INVENTION

There are approximately 1.7 million active oil and gas wells in the US. At this point in time, hundreds of thousands of these oil and gas wells have declined or depleted to the point of being marginally economical. As wells age, multiple mechanisms contribute to the production decline.

In addition to mechanical failures of a well's infrastructure, the following formation damage accelerates the production decline:
  A drop in bottom hole pressure as the well depletes, which decreases relative permeability and increases liquified loading
  Fines migration, mechanically induced by flow velocity[1]
  Scaling, precipitates, paraffins/asphaltenes and clay swelling
  Water or condensate block
  Fracturing (frac) hits Enhancing well productivity has traditionally been done using stimulation methods that increase the permeability of the reservoir rock or lower the oil viscosity. Matrix acidizing (see: "Sandstone Matrix Acidizing Knowledge and Future Development", by Mian Umer Shafiq and Hisham Ben Mahmud, *J. Petrol Explor Prod Technol* (2017) 7: 1205-1216), as a method of stimulation, is relatively inexpensive but narrow in scope. Ideal candidates for this process typically include wells in formations with a permeability of >10 mD and where solids plug the pores near the wellbore and/or at the perforations. The refracturing process is at the other end of the spectrum. This can be used to stimulate productivity, but it is a costlier option and riskier value proposition, especially for unconventional wells.

Gases and Liquified Gases, such as carbon dioxide, nitrogen, natural gas, liquified natural gas and liquified carbon dioxide have a long history of improving relative permeability, providing energy and drive in miscible and immiscible recovery applications. Studies have shown that Huff n Puff (hereinafter abbreviated as "HNP") treatments with gas have achieved particularly positive results on oil recovery and short-term production (FIG. 2).

Nitrogen-HNP has also shown very beneficial results in field studies carried out in suitable formations in the Appalachian Basin (see "Field Case: Cyclic Gas Recovery for Light Oil Using Carbon Dioxide/Nitrogen/Natural Gas", written by B. J. Miller and T. Hamilton-Smith, SPE 49169, Conference: SPE Annual Technical Meeting and Exhibition, September 1998). HNP treatments for stimulating well production are usually individual, cyclic well treatments comprising three phases: injection, soaking and production.

HNPs also provide important information on injectivity and pressure communication with adjacent wells. As a proven, single-well stimulation method, they can dramatically increase production from stripper, depleted or low-pressure oil wells. Under certain conditions, carbon dioxide and nitrogen can become miscible with crude, lowering its viscosity and thereby further enhancing recovery.

Over the years, carbon dioxide, nitrogen, natural gas, liquified natural gas and liquified carbon dioxide HNP treatments have been used as an affordable, effective means of enhancing recovery. They are an ideal solution for marginal wells in advanced decline and an effective way of stimulating reservoirs with poor inter-well communications. More recently, studies have shown that HNP injection is a more effective method for enhancing oil production from shales than continuous gas flooding (see "Optimization of huff-n-puff gas injection in shale oil reservoirs", written by J. J. Sheng, Petroleum, 2017 and "Gas Selection for Huff-n-Puff EOR In Shale Oil Reservoirs Based upon Experimental and Numerical Study", written by L. Li and J. J. Sheng, SPE-185066-MS, 2017.)

Treatments can be applied multiple times to a single well to support improved oil recovery (IOR) and enhanced oil recovery (EOR). Small volumes of Carbon Dioxide can generate significant increases in recoverable reserves and production that provide quick payback as a result of that increased production.

Nanoparticles have been at the forefront of research into various applications in the oil and gas industry for at least a decade now. Nanoparticles are usually particles under 100 nm in size and can be made up of various inorganic materials such as silica, alumina and oxides of iron. Nanoparticles can be structured to contain an inner core and an outer shell (see "Nanofluids Science and Technology", written by S. K. Das, S. U. S. Choi, W. Yu, and T. Pradeep, Hoboken, N.J.: John Wiley & Sons, Inc Publishing. ISBN 0470074736). Their outer shell can be modified to alter their wettability. Nanoparticles (either unmodified or modified) can then be dispersed in an aqueous or organic medium such as water, methanol or isopropanol and deployed. Nanoparticles are highly versatile and can be designed for specific applications.

The true mode of action of nanoparticles in a reservoir depends on how they are designed and deployed. However, laboratory studies have shown that nanoparticles in dispersion can align themselves at the oil, aqueous, solid three-phase contact angle (see "Spreading of Nanofluids on Solids", written by D. T. Wasan and Nikolov, *Journal of Nature* (423): 156-159, A. 2003.). The alignment of the nanoparticles in a wedge between oil and rock generates what is known as structural disjoining pressure, which helps create a pressure gradient sufficient to lift an oil droplet off the surface of the rock. This phenomenon results in increased oil recovery rates and has been demonstrated in imbibition and in-core flow tests (see "Spreading of Nanofluids on Solids", written by D. T. Wasan and Nikolov, *Journal of Nature* (423): 156-159, A. 2003.).

In the field, case studies have been reported that exhibit the effectiveness of nanoparticle dispersions. In one field trial, a silicon dioxide-based nanoparticle dispersion was deployed in a hydraulic fracturing application (see "Application of Nanofluid Technology to Improve Recovery in Oil and Gas Wells", written by P. M. Mcelfresh, D. L. Holcomb and D. Ector, *Society of Petroleum Engineers*. doi:10.2118/154827-MS, 2012, Jan. 1). The dispersion was deployed as a pre-pad pill ahead of the pad stage in a fracture job for first contact with the reservoir in five wells in the Wolfcamp and Bone Spring formations in the Permian Basin. Field results displayed significant increases in initial production of around 20 percent compared with the type curves. These rates appeared to be sustained for the successful wells even in the presence of an offset fracture breakthrough. The results also showed a decrease in the initial effective decline rate.

Further references in this area include:

Carpenter, C., Journal of Petroleum Technology, Modelling of Production Decline Caused by Fines Migration in Deepwater Reservoirs, February 2018; Eagle Ford Type Curve, eia.gov/analysis/studies/usshalegas/pdf/usshaleplays.pdf;

Wei, B., Pu, W., Pang, S., Kong, L., Mechanisms of $N_2$ and $CO_2$ Assisted Steam Huff-n-Puff Process in Enhancing Heavy Oil Recovery: A Case Study Using Experimental and Numerical Simulation, Conference: Conference: SPE Middle East Oil & Gas Show and Conference, January 2017;

Miller, B. J., Hamilton-Smith, T., SPE 49169 "Field Case: Cyclic Gas Recovery for Light Oil Using Carbon Dioxide/Nitrogen/Natural Gas", Conference: SPE Annual Technical Meeting and Exhibition, September 1998;

Sheng, J. J., Optimization off huff-n-puff gas injection in shale oil reservoirs, Petroleum, 2017;

Li, L., Sheng, J. J., Gas Selection for Huff-n-Puff EOR In Shale Oil Reservoirs Based upon Experimental and Numerical Study, SPE-185066-MS, 2017;

Palmer, F. S., Landry, R. W., Bou-Mikael, S. SPE 15497, "Design and Implementation of Immiscible Carbon Dioxide Displacement Projects ($CO_2$ Huff-Puff) in South Louisiana", Conference: SPE Annual Technical Meeting and Exhibition, October 1986;

Das, S. K., Choi, S. U.S., Yu, W., and Pradeep, T. 2008. Nanofluids Science and Technology. Hoboken, N.J.: John Wiley & Sons, Inc Publishing. ISBN 0470074736;

Wasan, D. T., and Nikolov, Spreading of Nanofluids on Solids. Journal of Nature (423): 156-159, A. 2003;

Mcelfresh, P. M., Holcomb, D. L., & Ector, D. Application of Nanofluid Technology to Improve Recovery in Oil and Gas Wells. Society of Petroleum Engineers. doi: 10.2118/154827-MS, 2012, Jan. 1 and Syfan, F. E., Holcomb, D. L., Lowrey, T. A., Nickerson, R. L., Sam, A. B., & Ahmad, Y. Enhancing Delaware Basin Stimulation Results Using Nanoparticle Dispersion Technology. Society of Petroleum Engineers. doi:10.2118/189876-MS, 2018, Jan. 23.

U.S. Pat. No. 4,390,068, "Carbon Dioxide Stimulated Oil Recovery Process", issued 8 Jun. 1983, describes and claims a process of stimulating oil recovery using carbon dioxide in the liquified state. The carbon dioxide is introduced into an underground formation where it partially dissolves in the crude oil present therein. A back pressure in the range of atmospheric to approximately 300 psi is maintained on the formation while the oil containing carbon dioxide is withdrawn. The carbon dioxide is thereafter separated from the oil.

U.S. Pat. No. 5,381,863, "Cyclic Huff-n-Puff with Immiscible Injection and Miscible Production Steps" issued 17 Jan. 1995, describes and claims a method of recovering hydrocarbons from a reservoir under an active waterflood or water drive by injecting a recovery fluid comprising carbon dioxide or nitrogen under immiscible conditions, allowing the recovery fluid to soak, and producing the recovery fluid and formation fluids under conditionally miscible or miscible conditions after pressure has sufficiently increased in the wellbore area.

U.S. Pat. No. 7,216,712 "Treatment of Oil Wells" issued 15 May 2007, describes and claims a method wherein hydrocarbon solids are removed from an oil well by feeding into the oil well a composition comprising at least 40 vol. % dense phase carbon dioxide and at least 30 vol. % of a $C_1 C_3$ alkanol component and optionally one or more surfactants, under a pressure of 300 to 10,000 psia and a temperature of 90° F. to 120° F., holding the composition in the well to solubilize hydrocarbon solids, and then removing from the well a liquified composition comprising solubilized hydrocarbon solids and alkanol. Gases such as Carbon Dioxide, Nitrogen, Natural Gas and/or Natural Gas Liquifieds can also be used in waterless fracturing of a suitable hydrocarbon-bearing formation.

The article, "Waterless fracturing technologies for unconventional reservoirs-opportunities for liquified nitrogen", Journal of Natural Gas Science and Engineering, 35 (2016) 160-174, by Lei Wang et al., describes waterless fracturing technologies. During the past two decades, hydraulic fracturing has significantly improved oil and gas production from shale and tight sandstone reservoirs in the United States and elsewhere. Considering formation damage, water consumption and environmental impacts associated with water-based fracturing fluids, efforts have been devoted to developing waterless fracturing technologies because of their potential to alleviate these issues. Key theories and features of waterless fracturing technologies, including Oil-based and Carbon Dioxide energized oil fracturing, explosive and propellant fracturing, gelled Liquified Petroleum Gas ("LPG") and alcohol fracturing, gas fracturing, Carbon Dioxide fracturing, and cryogenic fracturing are reviewed. Experimental results are shown describing the efficacy of liquified nitrogen in enhancing fracture initiation and propagation in concrete samples, and shale and sandstone reservoir rocks. In the laboratory study, cryogenic fractures generated were qualitatively and quantitatively characterized by pressure decay tests, acoustic measurements, gas fracturing and CT scans. The capacity and applicable of cryogenic fracturing using liquified nitrogen are demonstrated and examined. By properly formulating the technical procedures for field implementation, cryogenic fracturing using liquified nitrogen could be an advantageous option for fracturing unconventional reservoirs.

The Linde Group, is one of the leading gases and engineering companies in the world, working in more than 100 countries worldwide. The Linde Group is located in Klosterhofstrasse 1, 80 331 Munich, Germany 80331. Since the early 1990s, Linde has deployed Huff'n Puff technology to inject carbon dioxide into depleted wells to incrementally increase oil production. Less costly than refracturing, Huff'n Puff provides the energy to give hydrocarbons in low-pressure zones the necessary lift to get them flowing to the wellbore.

Nissan Chemical America Corporation is a leading manufacturer of colloidal silica and colloidal electro-conductive oxide solutions. Located at 10333 Richmond Avenue, Suite 1100, Houston, Tex. 77042, Nissan Chemical America Corporation is a wholly owned subsidiary of Nissan Chemical Corporation, Ltd. a Japanese company. Nissan Chemical America Corporation offers colloidal silica products for sale as well as Hydrocarbon Recovery Fluids incorporating colloidal silica products.

Improved oil recovery treatment methods play an increasing role in the oil and gas industry, as existing fields become depleted resulting in reduced production. What would be desirable are new and modified well stimulation (remediation) methods to increase the recovery of hydrocarbons and reducing the water cut from an underperforming well, preferably using non-aqueous materials.

SUMMARY OF THE INVENTION

The first aspect of the instant claimed invention is a process of stimulating hydrocarbon recovery comprising
  (a) introducing a gas, a liquified gas or a vaporized liquified gas, into an underground formation containing hydrocarbons;
  (b) permitting said gas or a vaporized liquified gas to be absorbed by said hydrocarbons,
  (c) withdrawing said hydrocarbons containing said gas, liquified gas or vaporized liquified gas absorbed therein; and
  wherein a pill of Hydrocarbon Recovery Fluid comprising surface functionalized nanoparticles is inserted into the underground formation containing hydrocarbons, before, during or after the introduction of the gas, liquified gas or vaporized liquified gas.

The second aspect of the instant claimed invention is the process of the first aspect of the instant claimed invention wherein the injected gas, liquified gas or a vaporized liquified gas and Hydrocarbon Recovery Fluid comprising surface functionalized nanoparticles may also include one or more injectants, selected from the group consisting of fresh water, KCl water, diverters and any other injectant currently used in oil field remediation as part of the treatment.

The third aspect of the instant claimed invention is the process of the first aspect of the instant claimed invention wherein said pill of Hydrocarbon Recovery Fluid comprising surface functionalized nanoparticles is inserted into the underground formation containing hydrocarbons before the introduction of the gas, liquified gas or a vaporized liquified gas.

The fourth aspect of the instant claimed invention is the process of the first aspect of the instant claimed invention wherein said pill of Hydrocarbon Recovery Fluid comprising surface functionalized nanoparticles is inserted into the underground formation containing hydrocarbons during the introduction of the gas, liquified gas or a vaporized liquified gas.

The fifth aspect of the instant claimed invention is the process of the first aspect of the instant claimed invention wherein said pill of Hydrocarbon Recovery Fluid comprising surface functionalized nanoparticles is inserted into the underground formation containing hydrocarbons after the introduction of the gas, liquified gas, or a vaporized liquified gas.

The sixth aspect of the instant claimed invention is the process of the first aspect of the instant claimed invention wherein said gas is selected from the group consisting of carbon dioxide, nitrogen, natural gas, liquified natural gas, liquified carbon dioxide and/or mixtures thereof.

The seventh aspect of the instant claimed invention is the process of the first aspect of the instant claimed invention wherein said gas is carbon dioxide.

The eighth aspect of the instant claimed invention is the process of the first aspect of the instant claimed invention wherein said gas is nitrogen.

The ninth aspect of the instant claimed invention is the process of the first aspect of the instant claimed invention wherein said gas is natural gas.

The tenth aspect of the instant claimed invention is the process of the first aspect of the instant claimed invention wherein said gas is liquified natural gas, liquified carbon dioxide and/or mixtures thereof.

The eleventh aspect of the instant claimed invention is the process of the sixth aspect of the instant claimed invention wherein said gas is a mixture of two or more gases selected from the group consisting of carbon dioxide, nitrogen, natural gas, liquified natural gas, liquified carbon dioxide and/or mixtures thereof.

The twelfth aspect of the instant claimed invention is the process of the first aspect of the instant claimed invention wherein said process is part of a huff and puff treatment process.

The thirteenth aspect of the instant claimed invention is the process of the twelfth aspect of the instant claimed invention wherein said process is a waterless fracturing process.

The fourteenth aspect of the instant claimed invention is the process of the thirteenth aspect of the instant claimed invention wherein said process is a less water fracturing process.

The process for stimulating hydrocarbon recovery comprises injection of a gas, such as carbon dioxide, nitrogen, natural gas, liquified natural gas, liquified carbon dioxide and/or mixtures thereof into an underground formation containing hydrocarbons, permitting said gas to flush liquids, such as condensate, water, etc. etc., and debris in the near well bore area and to pressurize the well up to 500 psi. In the event the gas is miscible in the crude oil, the gas will cause it to swell and reduce viscosity. The stimulation process includes combining injection of gas with a pill of Hydrocarbon Recovery Fluid comprising surface functionalized nanoparticles, which may be introduced before, during or after the gas.

The surface functionalized nanoparticles have specific unique properties that enables hydrocarbon production from micro to nano sized spaces, including those spaces classified as voids or fractures. The surface functionalized nanoparticles may cause wettability alteration of solid/liquified surfaces facilitating flow. The stimulation process involves combining gas and Hydrocarbon Recovery Fluid comprising surface functionalized nanoparticles which results in a hydrocarbon production enhancement that is attributable to synergistic effects.

DETAILED DESCRIPTION OF THE INVENTION

Figure 1:
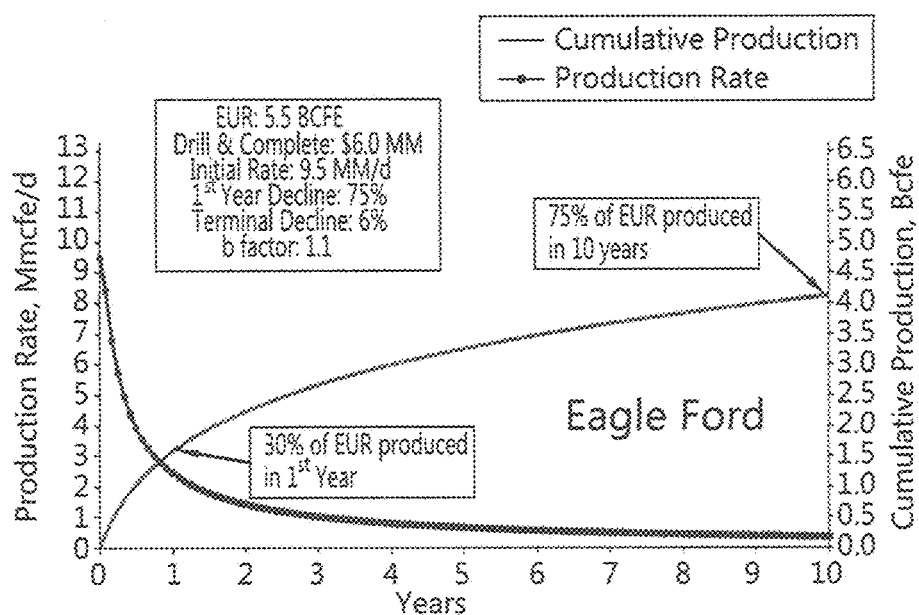
FIG. 1. Example of a production decline curve. Taken from Palmer, F. S., Landry, R. W., Bou-Mikael, S. SPE 15497, "Design and Implementation of Immiscible Carbon Dioxide Displacement Projects (CO2 Huff-Puff) in South Louisiana", Conference: SPE Annual Technical Meeting and Exhibition, October 1986. Not an example of the instant claimed invention.
Figure 2:
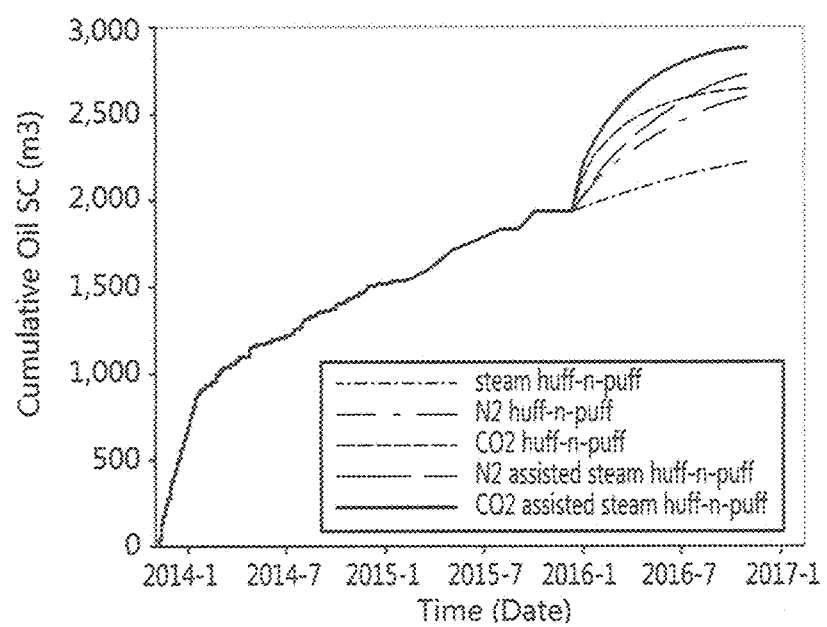
FIG. 2. Comparisons of oil recovery using $CO_2$, $N_2$, and steam HNP treatments. Figure taken from Wasan, D. T., and Nikolov, Spreading of Nanofluids on Solids. Journal of Nature (423): 156-159, A. 2003. Not an example of the instant claimed invention.
Figure 3:
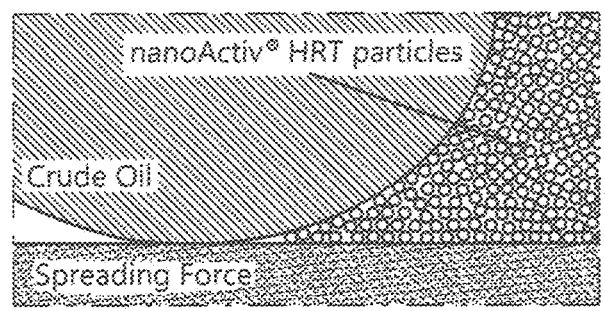
FIG. 3: Nanoparticles aligned at the three-phase contact angle to support hydrocarbon recovery (see Wasan et al., 2003). Not an example of the instant claimed invention.

Throughout this patent application the term "pill" has the following definition: Pill—Any relatively small quantity of a special blend of drilling fluid to accomplish a specific task that the regular drilling fluid cannot perform. Fluid pills are commonly prepared for a variety of special functions. Pills are small quantities of drilling fluids and it is understood that more than one pill may be added to a hydrocarbon formation.

The first aspect of the instant claimed invention is a process of stimulating hydrocarbon recovery comprising
(a) introducing a gas, liquified gas or a vaporized liquified gas, into an underground formation containing hydrocarbons;
(b) permitting said gas, liquified gas or a vaporized liquified gas to be absorbed by said hydrocarbons,
(c) withdrawing said hydrocarbons containing said gas, liquified gas or vaporized liquified gas absorbed therein; and
wherein a pill of Hydrocarbon Recovery Fluid comprising surface functionalized nanoparticles is inserted into the underground formation containing hydrocarbons, before, during or after the introduction of the gas, liquified gas or vaporized liquified gas.

The surface functionalized nanoparticles may be made from any suitable material. Non-limiting examples of suitable surface functionalized nanoparticle materials include ceramics, metals, metal oxides (e.g., silica, titania, alumina, zirconia, vanadyl, ceria, iron oxide, antimony oxide, tin oxide, aluminum, zinc oxide, boron, and combinations thereof), polymers (e.g., polystyrene), resins (e.g., silicone resin), and pigments (e.g., chromite spinel pigments). In some embodiments, the surface functionalized nanoparticles comprise a plurality of hydrophobized nanoparticles. In some embodiments the surface functionalized nanoparticles are surface functionalized colloidal silica nanoparticles.

It is generally well known in oilfield applications that subterranean formations contain large amounts of water containing dissolved salts such as NaCl, $CaCl_2$, KCl, $MgCl_2$ and others. This aqueous salt mixture is typically referred to as Brine. Brine conditions for different regions and wells vary widely with different downhole conditions and lithologies. In general, fluids used downhole must either tolerate briny conditions or have brine-resistant properties.

Colloidal systems in general and aqueous colloidal silica rely primarily upon electrostatic repulsion between charged silica particles to avoid unwanted or adverse phenomena such as particle agglomeration, flocculation, gelation and sedimentation. This electrostatic repulsion is easily disrupted in briny conditions typically found in subterranean formations. Furthermore, agglomeration/flocculation/gelation/sedimentation of colloidal silica and fluids containing colloidal silica in downhole applications would have the potential to damage the well or potentially plug the well entirely. Therefore, application of colloidal silica in downhole applications necessitates imparting brine resistant properties to colloidal silica and fluids containing colloidal silica before application.

In order not to gel upon exposure to brine (salt water), the nanoparticles must have a surface functionalization that stabilizes the colloidal silica. The surface functionalization of the colloidal silica allows the colloidal silica to be resistant to the effects of brine (salt water) and heat. Surface functionalized colloidal silica are typically referred to as "brine resistant silica sols". Hydrocarbon Recovery Fluids comprising surface functionalized colloidal silica are used, along with gases described herein to effectuate the further removal of hydrocarbons from underperforming wells.

Standard tests for brine stability are disclosed in the following paragraphs:

API Brine by Visual Observation:

A 10 wt % API Brine solution is prepared by dissolving 8 wt % NaCl (SigmaAldrich) and 2 wt % $CaCl_2$) (Sigma Aldrich) in distilled water. Testing for Brine resistance is done by placing 1 gram of example silica sol into 10 grams of API Brine Solution. Stability observations are performed at standard brine exposure periods of 10 minutes and 24 hours. These observations include the clarity and transparency of the silica sol. The results of these observations are recorded at these times. Silica sol solutions that are stable to Brine exposure will remain clear and transparent/opalescent while unstable examples become visibly hazy and opaque after brine exposure.

Artificial Seawater by Visual Observation

Artificial seawater is prepared by dissolving Fritz Pro Aquatics RPM Reef Pro Mix (Fritz Industries, Inc.) at 6 wt % in distilled water. Testing for Brine resistance is done by placing 1 gram of example silica sol into 10 grams of Artificial Seawater. Stability observations are performed at standard brine exposure periods of 10 minutes and 24 hours. These observations include the clarity and transparency of the silica sol. The results of these observations are recorded at these times. Silica sol solutions that are stable to Brine exposure will remain clear and transparent/opalescent while unstable examples become visibly hazy and opaque after brine exposure.

API Brine Resistance Test by Use of a Turbidimeter

Reference: US EPA 180.1 Determination of Turbidity by Nephelometry

A difference between this test and the US EPA 101.1 test is that in this test, step 11.2 is not followed:

Step 11.2 reads as follows: Turbidities exceeding 40 units: Dilute the sample with one or more volumes of turbidity-free water until the turbidity falls below 40 units. The turbidity of the original sample is then computed from the turbidity of the diluted sample and the dilution factor. For example, if 5 volumes of turbidity-free water were added to 1 volume of sample, and the diluted sample showed a turbidity of 30 units, then the turbidity of the original sample was 180 units.

For this work, the actual ("raw") value of turbidity is recorded, whether it is above, below or equal to 40.

Test solutions/surface treated silicasols are tested for Brine resistance by Turbidimetry.

A calibrated Hach 2100AN Turbidimeter is used to measure Turbidity in units of NTU (Nephelometric Turbidity Units).

Test solution amounts of 3.0 g are placed into standard turbidity test tubes of approximately 30 ml.

Twenty-seven grams (27 g) of 10% API brine (8 wt % NaCl, 2 wt % $CaCl_2$) are added to the test tube and the mixture inverted three times to mix test solution and brine. Test solution concentrations are therefore 10 wt % in API Brine.

Sample test tubes are inserted into the Turbidimeter and an initial measurement of turbidity is taken immediately, followed by a turbidity measurement after 24 hours.

A change in turbidity of more than 100NTU leads to the conclusion that the silica sol is not brine stable. Conversely a change in turbidity of less than 100NTU after API brine exposure leads to the conclusion that the silica sol is brine stable.

Dynamic Light Scattering Method

Whether the silica particles in the aqueous silica sol are dispersed or coagulated can be determined by measuring the average particle diameter by dynamic light scattering (DLS average particle diameter) for silica particles of the silica sol in the chemical fluid.

The DLS average particle diameter represents the average value of secondary particle diameter (dispersed particle diameter), and it is said that the DLS average particle diameter in a completely dispersed state is about twice the average particle diameter (which represents the average value of primary particle diameter in terms of specific surface diameter obtained through measurement by nitrogen adsorption (BET method) or Sears' particle diameter). It then can be determined that as the DLS average particle diameter increases, the silica particles in the aqueous silica sol is more coagulated.

In a case where the Hydrocarbon Recovery Fluid comprising surface functionalized nanoparticles has a good resistance to high temperature and salt, the DLS average particle diameter after a high temperature and salt resistance test is almost the same as the DLS average particle diameter of the chemical fluid. For example, if the ratio of the DLS average particle diameter after a high temperature and salt resistance test/the DLS average particle diameter of the Hydrocarbon Recovery Fluid comprising surface functionalized nanoparticles is 1.1 or less, it shows that the Hydrocarbon Recovery Fluid comprising surface functionalized nanoparticles after a high temperature and salt resistance test maintains the similar dispersion state as that of the Hydrocarbon Recovery Fluid comprising surface functionalized nanoparticles. However, when the resistance to high temperature and salt of the Hydrocarbon Recovery Fluid comprising surface functionalized nanoparticles is poor, the DLS particle diameter after a high temperature and salt resistance test is much larger, showing that the Hydrocarbon Recovery Fluid comprising surface functionalized nanoparticles is in a coagulated state.

For the Hydrocarbon Recovery Fluid comprising surface functionalized nanoparticles if the ratio of the DLS average particle diameter after a high temperature and salt resistance test to the DLS average particle diameter of the Hydrocarbon Recovery Fluid comprising surface functionalized nanoparticles is 1.5 or less (ratio of change of average particle diameter is 50% or less), the conclusion reached is that the resistance to high temperature and salt is good. If the ratio of the DLS average particle diameter after a high temperature and salt resistance test to the DLS average particle diameter of the Hydrocarbon Recovery Fluid comprising surface functionalized nanoparticles is 1.1 or less (ratio of change of average particle diameter is 10% or less) there is no degradation of silica sol, the conclusion reached is that the resistance to high temperature and salt is very good.

After multiple tests of proposed brine resistant silica sols, it has been discovered that brine resistance of aqueous colloidal silica can be improved over untreated colloidal silica by addition of certain types of organic surface treatment. There are many different types of organic surface treatments that can be used. What follows are tables showing formulations for many acceptable surface-treated colloidal silicas. These brine resistant silica sols are also known as "surface functionalized" colloidal silicas.

In the following potential examples, each ingredient that is used to create a surface treated colloidal silica, is listed as Parts of Ingredient, per 100 parts of surface treated colloidal silica.

ST-O25 and ST-32C are commercially available colloidal silicas from Nissan Chemical America Corporation, located at 10333 Richmond Avenue, Suite 1100 Houston, Tex. 77042 or from Nissan Chemical Corporation, located at 5-1, Nihonbashi 2-Chome, Chuo-ku, Tokyo 103-6119, Japan.

| Ingredients | Examples | | | | | |
|---|---|---|---|---|---|---|
| | 1 | 2 | 3 | 4 | 5 | 6 |
| ST-O25 | 76 | 76 | 76 | 76 | 76 | 76 |
| Deionized water | 11.1 | 11.1 | 11.1 | 11.1 | 11.1 | 11.1 |
| Propylene Glycol | 10 | 10 | 10 | 10 | 10 | 10 |
| 3-(Triethoxysilyl)propyl Succinic Anhydride | 2.9 | | | | | |
| N-(Triethoxysilyl)propyl)-O-Polyethyleneoxide Urethane | | 2.9 | | | | |
| Silane, trimethoxy[3-(oxiranyl methoxy)propyl] | | | 2.9 | | | |
| 3-Ureidopropyl Triethoxysilane | | | | 2.9 | | |
| 2-(3,4 epoxycyclohexyl)-ethyltrimethoxysilane | | | | | 1 | |
| 3-(Trimethoxysilyl)propyl Methacrylate | | | | | | 1 |
| Total | 100.00 | 100.00 | 100.00 | 100.00 | 100.00 | 100.00 |

| Ingredients | Examples | | | | | | |
|---|---|---|---|---|---|---|---|
| | 7 | 8 | 9 | 10 | 11 | 12 | 13 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| 3-(Triethoxysilyl)propyl Succinic Anhydride | 1.9 | 1.9 | 1.9 | 1.9 | 1.9 | 1.9 | 1.9 |
| Hexamethyl Disiloxane | 1 | | | | | | |
| Hexamethyl Disilazane | | 1 | | | | | |
| Trimethoxy Methyl Silane | | | 1 | | | | |
| Trimethoxy Phenyl Silane | | | | 1 | | | |
| Vinyl Trimethoxysilane | | | | | 1 | | |
| 3-(N,N-DimethylaminoPropyl)-Trimethoxysilane | | | | | | 1 | |
| 3-(Diethylamino)propyl trimethoxysilane | | | | | | | 1 |
| Total | 100 | 100 | 100 | 100 | 100 | 100 | 100 |

-continued

Examples

| Ingredients | 14 | 15 | 16 | 17 | 18 | 19 | 20 | 21 |
|---|---|---|---|---|---|---|---|---|
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Propylene Glycol | 10 | 10 | 10 | 10 | 10 | 10 | 10 | 10 |
| 3-(Triethoxysilyl)propyl Succinic Anhydride | 1.9 | 1.9 | 1.9 | 1.9 | 1.9 | 1.9 | 1.9 | 1.9 |
| Trimethoxy(octadecyl)silane | 1 | | | | | | | |
| Isobutyl Trimethoxysilane | | 1 | | | | | | |
| Hexyltrimethoxysilane | | | 1 | | | | | |
| Decyltrimethoxysilane | | | | 1 | | | | |
| Isooctyltrimethoxysilane | | | | | 1 | | | |
| Hexadecyltrimethoxysilane | | | | | | 1 | | |
| Propyltrimethoxysilane | | | | | | | 1 | |
| Octyltriethoxysilane | | | | | | | | 1 |
| Total | 100 | 100 | 100 | 100 | 100 | 100 | 100 | 100 |

Examples

| Ingredients | 22 | 23 | 24 | 25 | 26 | 27 | 28 | 29 | 30 |
|---|---|---|---|---|---|---|---|---|---|
| ST-O25 | 70 | 80 | 75 | 72 | 76 | 76 | 76 | 76 | 76 |
| Deionized water | 14.1 | 19.1 | 11.1 | 13.1 | 11.1 | 11.1 | 11.1 | 11.1 | 11 |
| Propylene Glycol | 13 | 8 | 10 | 12 | 10 | 10 | 10 | 10 | 10 |
| 3-(Triethoxysilyl)propyl Succinic Anhydride | 2.9 | | | | | | | | |
| N-(Triethoxysilylpropyl)-O-Polyethyleneoxide Urethane | | 2.9 | | | 1.9 | 1.9 | 1.9 | 1.9 | 1.9 |
| Silane, trimethoxy[3-(oxiranyl methoxy)propyl | | | 3.9 | | | | | | |
| 3-Ureidopropyl Triethoxysilane | | | | 2.9 | | | | | |
| 2-(3,4 epoxycyclohexyl)-ethyltrimethoxysilane | | | | | 1 | | | | |
| 3-(Trimethoxysilyl)propyl Methacrylate | | | | | | 1 | | | |
| Hexamethyl Disiloxane | | | | | | | 1 | | |
| Hexamethyl Disilazane | | | | | | | | 1 | |
| Trimethoxy Methyl Silane | | | | | | | | | 1 |
| Total | 100 | 100 | 100 | 100 | 100 | 100 | 100 | 100 | 100 |

-continued

| Ingredient | Examples | | | | | | |
|---|---|---|---|---|---|---|---|
| | 31 | 32 | 33 | 34 | 35 | 36 | 37 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| N-(Triethoxysilylpropyl)-O-Polyethyleneoxide Urethane | 1.9 | 1.9 | 1.9 | 1.9 | 1.9 | 1.9 | 1.9 |
| Trimethoxy Phenyl Silane | 1 | | | | | | |
| Vinyl Trimethoxysilane | | 1 | | | | | |
| 3-(N,N-Dimethylaminopropyl)-Trimethoxysilane | | | 1 | | | | |
| 3-(Diethylamino)propyl trimethoxysilane | | | | 1 | | | |
| Trimethoxy-(octadecyl)silane | | | | | 1 | | |
| Isobutyl Trimethoxysilane | | | | | | 1 | |
| Hexyl-trimethoxysilane | | | | | | | 1 |
| Total | 100 | 100 | 100 | 100 | 100 | 100 | 100 |

| Ingredients | Examples | | | | | |
|---|---|---|---|---|---|---|
| | 38 | 39 | 40 | 41 | 42 | |
| ST-O25 | 76 | 76 | 76 | 76 | 76 | |
| Deionized water | 11.1 | 11.1 | 11.1 | 11.1 | 11.1 | |
| Propylene Glycol | 10 | 10 | 10 | 10 | 10 | |
| N-(Triethoxysilylpropyl)-O-Polyethyleneoxide Urethane | 1.9 | 1.9 | 1.9 | 1.9 | 1.9 | |
| Decyl-trimethoxysilane | 1 | | | | | |
| Isooctyl-trimethoxysilane | | 1 | | | | |
| Hexadecyl-trimethoxysilane | | | 1 | | | |
| Propyl-trimethoxysilane | | | | 1 | | |
| Octyl-triethoxysilane | | | | | 1 | |
| Total | 100.00 | 100.00 | 100.00 | 100.00 | 100.00 | |

-continued

| Ingredients | Examples | | | | | | | | |
|---|---|---|---|---|---|---|---|---|---|
| | 43 | 44 | 45 | 46 | 47 | 48 | 49 | 50 | 51 |
| ST-O25 | 76 | 76 | 70 | 80 | 76 | 76 | 76 | 76 | 76 |
| Deionized water | 10 | 9 | 16.1 | 11.1 | 11.1 | 11.1 | 11.1 | 11.1 | 11.1 |
| Propylene Glycol | 11.1 | 12.1 | 11 | 6 | 10 | 10 | 10 | 10 | 10 |
| 3-(Triethoxysilyl)propyl Succinic Anhydride | 2.9 | | | | | | | | |
| N-(Triethoxysilylpropyl)-O-Polyethyleneoxide Urethane | | 2.9 | | | | | | | |
| Silane,trimethoxy[3-(oxiranyl methoxy)propyl | | | 2.9 | | 1.9 | 1.9 | 1.9 | 1.9 | 1.9 |
| 3-Ureidopropyl Triethoxysilane | | | | 2.9 | | | | | |
| 2-(3,4 epoxycyclohexyl)-ethyltrimethoxysilane | | | | | 1 | | | | |
| 3-(Trimethoxysilyl)propyl Methacrylate | | | | | | 1 | | | |
| Hexamethyl Disiloxane | | | | | | | 1 | | |
| Hexamethyl Disilazane | | | | | | | | 1 | |
| Trimethoxy Methyl Silane | | | | | | | | | 1 |
| Total | 100 | 100 | 100 | 100 | 100 | 100 | 100 | 100 | 100 |

| Ingredient | Examples | | | | | | |
|---|---|---|---|---|---|---|---|
| | 52 | 53 | 54 | 55 | 56 | 57 | 58 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| Silane, trimethoxy[3-(oxiranyl methoxy)propyl | 1.9 | 1.9 | 1.9 | 1.9 | 1.9 | 1.9 | 1.9 |
| Trimethoxy Phenyl Silane | 1 | | | | | | |
| Vinyl Trimethoxysilane | | 1 | | | | | |
| 3-(N,N-Dimethylaminopropyl)-Trimethoxysilane | | | 1 | | | | |
| 3-(Diethylamino)propyl trimethoxysilane | | | | 1 | | | |
| Trimethoxy(octadecyl)silane | | | | | 1 | | |
| Isobutyl Trimethoxysilane | | | | | | 1 | |
| Hexyltrimethoxysilane | | | | | | | 1 |
| Total | 100.00 | 100.00 | 100.00 | 100.00 | 100.00 | 100.00 | 100.00 |

-continued

| Ingredients | Examples | | | | | |
|---|---|---|---|---|---|---|
| | 59 | 60 | 61 | 62 | 63 | |
| ST-O25 | 76 | 76 | 76 | 76 | 76 | |
| Deionized water | 11.1 | 11.1 | 11.1 | 11.1 | 11.1 | |
| Propylene Glycol | 10 | 10 | 10 | 10 | 10 | |
| Silane, trimethoxy[3-(oxiranyl methoxy)propyl | 1.9 | 1.9 | 1.9 | 1.9 | 1.9 | |
| Decyltrimethoxysilane | 1 | | | | | |
| Isooctyltrimethoxysilane | | 1 | | | | |
| Hexadecyltrimethoxysilane | | | 1 | | | |
| Propyltrimethoxysilane | | | | 1 | | |
| Octyltriethoxysilane | | | | | 1 | |
| Total | 100.00 | 100.00 | 100.00 | 100.00 | 100.00 | |

| Ingredients | Examples | | | | | | | | | |
|---|---|---|---|---|---|---|---|---|---|---|
| | 64 | 65 | 66 | 67 | 68 | 69 | 70 | 71 | 72 | 73 |
| ST-O25 | 76 | 76 | 76 | 76 | 76 | 76 | 76 | 76 | 76 | 76 |
| Deionized water | 11.1 | 11.1 | 11.1 | 11.1 | 11.1 | 11.1 | 11.1 | 11.1 | 11 | 11.1 |
| Propylene Glycol | 10 | 10 | 10 | 10 | 10 | 10 | 10 | 10 | 10 | 10 |
| 3-(Triethoxysilyl)propyl Succinic Anhydride | 1.45 | 2.9 | | | | | | | | |
| N-(Triethoxysilylpropyl)-O-Polyethyleneoxide Urethane | 1.45 | | 2.9 | | | | | | | |
| Silane, trimethoxy[3-(oxiranyl methoxy)propyl | | | | 2.9 | | | | | | |
| 3-Ureidopropyl Triethoxysilane | | | | | 1 | | | | | |
| 2-(3,4 epoxycyclohexyl)-ethyltrimethoxysilane | | | | | | 1.9 | | 1.9 | | 1.9 |
| 3-(Trimethoxysilyl)propyl Methacrylate | | | | | | 1 | | | | |
| Hexamethyl Disiloxane | | | | | | | 1 | | | |
| Hexamethyl Disilazane | | | | | | | | 1 | | |
| Trimethoxy Methyl Silane | | | | | | | | | 1 | |
| Trimethoxy Phenyl Silane | | | | | | | | | | 1 |
| Total | 100 | 100 | 100 | 100 | 100 | 100 | 100 | 100 | 100 | 100 |

-continued

| Ingredients | Examples | | | | | | | |
|---|---|---|---|---|---|---|---|---|
| | 74 | 75 | 76 | 77 | 78 | 79 | 80 | 81 |
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Propylene Glycol | 10 | 10 | 10 | 10 | 10 | 10 | 10 | 10 |
| 3-Ureidopropyl Triethoxysilane | 1.9 | 1.9 | 1.9 | 1.9 | 1.9 | 1.9 | 1.9 | 1.9 |
| Vinyl Trimethoxysilane | 1 | | | | | | | |
| 3-(N,N-Dimethylaminopropyl)-Trimethoxysilane | | 1 | | | | | | |
| 3-(Diethylamino)propyl trimethoxysilane | | | 1 | | | | | |
| Trimethoxy(octadecyl)silane | | | | 1 | | | | |
| Isobutyl Trimethoxysilane | | | | | 1 | | | |
| Hexyltrimethoxysilane | | | | | | 1 | | |
| Decyltrimethoxysilane | | | | | | | 1 | |
| Isooctyltrimethoxysilane | | | | | | | | |
| Hexadecyltrimethoxysilane | | | | | | | | |
| Propyltrimethoxysilane | | | | | | | | |
| Octyltriethoxysilane | | | | | | | | 1 |
| Total | 100.00 | 100.00 | 100.00 | 100.00 | 100.00 | 100.00 | 100.00 | 100.00 |

| Ingredients | Examples | | |
|---|---|---|---|
| | 82 | 83 | 84 |
| ST-O25 | 76 | 76 | 76 |
| Deionized water | 11.1 | 11.1 | 11.1 |
| Propylene Glycol | 10 | 10 | 10 |
| 3-Ureidopropyl Triethoxysilane | 1.9 | 1.9 | 1.9 |
| Hexadecyltrimethoxysilane | 1 | | |
| Propyltrimethoxysilane | | 1 | |
| Octyltriethoxysilane | | | 1 |
| Total | 100.00 | 100.00 | 100.00 |

-continued

| Ingredients | Examples | | | | |
|---|---|---|---|---|---|
| | 85 | 86 | 87 | 88 | 89 |
| ST-O25 | 76 | 76 | 76 | 76 | 76 |
| Deionized water | 11.1 | 11.1 | 11.1 | 11.1 | 11.1 |
| Ethylene Glycol | 10 | 10 | 10 | 10 | 10 |
| 3-(Triethoxysilyl)propyl Succinic Anhydride | 2.9 | | | | 1.9 |
| N-(Triethoxysilylpropyl)-O-Polyethyleneoxide Urethane | | 2.9 | | | |
| Silane, trimethoxy[3-(oxiranyl methoxy)propyl] | | | 2.9 | | |
| 3-Ureidopropyl Triethoxysilane | | | | 2.9 | |
| 2-(3,4 epoxycyclohexyl)-ethyltrimethoxysilane | | | | | 1 |
| 3-(Trimethoxysilyl)propyl Methacrylate | | | | | |
| Hexamethyl Disiloxane | | | | | |
| Hexamethyl Disilazane | | | | | |
| Total | 100.00 | 100.00 | 100.00 | 100.00 | 100.00 |

| Ingredients | Examples | | |
|---|---|---|---|
| | 90 | 91 | 92 |
| ST-O25 | 76 | 76 | 76 |
| Deionized water | 11.1 | 11.1 | 11.1 |
| Ethylene Glycol | 10 | 10 | 10 |
| 3-(Triethoxysilyl)propyl Succinic Anhydride | 1.9 | 1.9 | 1.9 |
| 3-(Trimethoxysilyl)propyl Methacrylate | 1 | | |
| Hexamethyl Disiloxane | | 1 | |
| Hexamethyl Disilazane | | | 1 |
| Total | 100.00 | 100.00 | 100.00 |

-continued

| Ingredients | Examples | | | | | | |
|---|---|---|---|---|---|---|---|
| | 93 | 94 | 95 | 96 | 97 | 98 | 99 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| 3-(Triethoxysilyl)propyl Succinic Anhydride | 1.9 | 1.9 | 1.9 | 1.9 | 1.9 | 1.9 | 1.9 |
| Trimethoxy Methyl Silane | 1 | | | | | | |
| Trimethoxy Phenyl Silane | | 1 | | | | | |
| Vinyl Trimethoxysilane | | | 1 | | | | |
| Total | 100.00 | 100.00 | 100.00 | 100.00 | 100.00 | 100.00 | 100.00 |

| Ingredients | Examples | | | | | |
|---|---|---|---|---|---|---|
| | 100 | 101 | 102 | 103 | 104 | 105 |
| ST-O25 | 76 | 76 | 76 | 76 | 76 | 76 |
| Deionized water | 11.1 | 11.1 | 11.1 | 11.1 | 11.1 | 11.1 |
| Ethylene Glycol | 10 | 10 | 10 | 10 | 10 | 10 |
| 3-(Triethoxysilyl)propyl Succinic Anhydride | 1.9 | 1.9 | 1.9 | 1.9 | 1.9 | 1.9 |
| Hexyltrimethoxysilane | 1 | | | | | |
| Decyltrimethoxysilane | | 1 | | | | |
| Isooctyltrimethoxysilane | | | 1 | | | |
| Hexadecyltrimethoxysilane | | | | 1 | | |
| Propyltriethoxysilane | | | | | 1 | |
| Octyltriethoxysilane | | | | | | 1 |
| Total | 100.00 | 100.00 | 100.00 | 100.00 | 100.00 | 100.00 |

-continued

| Ingredients | Examples | | | | | | |
|---|---|---|---|---|---|---|---|
| | 106 | 107 | 108 | 109 | 110 | 111 | 112 |
| ST-O25 | 78 | 74 | 76 | 76 | 76 | 76 | 76 |
| Deionized water | 11.1 | 11.1 | 11.1 | 11.1 | 11.1 | 11.1 | 11.1 |
| Ethylene Glycol | 8 | 12 | 10 | 10 | 10 | 10 | 10 |
| 3-(Triethoxysilyl)propyl Succinic Anhydride | 1.45 | | | | | | |
| N-(Triethoxysilylpropyl)-O-Polyethyleneoxide Urethane | 1.45 | 1.45 | 1.45 | | 1.9 | 1.9 | 1.9 |
| Silane, trimethoxy[3-(oxiranyl methoxy)propyl | | 1.45 | 1.45 | | | | |
| 3-Ureidopropyl Triethoxysilane | | | 1.45 | 1.45 | | | |
| 2-(3,4 epoxycyclohexyl)-ethyltrimethoxysilane | | | | | 1 | | |
| 3-(Trimethoxysilyl)propyl Methacrylate | | | | | | 1 | |
| Hexamethyl Disiloxane | | | | | | | 1 |
| Total | 100.00 | 100.00 | 100.00 | 100.00 | 100.00 | 100.00 | 100.00 |

| Ingredients | Examples | | | | | | |
|---|---|---|---|---|---|---|---|
| | 113 | 114 | 115 | 116 | 117 | 118 | |
| ST-O25 | 76 | 76 | 76 | 76 | 76 | 76 | |
| Deionized water | 11.1 | 11.1 | 11.1 | 11.1 | 11.1 | 11.1 | |
| Ethylene Glycol | 10 | 10 | 10 | 10 | 10 | 10 | |
| N-(Triethoxysilylpropyl)-O-Polyethyleneoxide Urethane | 1.9 | 1.9 | 1.9 | 1.9 | 1.9 | 1.9 | |
| Hexamethyl Disilazane | 1 | | | | | | |
| Trimethoxy Methyl Silane | | 1 | | | | | |
| Trimethoxy Phenyl Silane | | | 1 | | | | |
| Vinyl Trimethoxysilane | | | | 1 | | | |
| 3-(N,N-Dimethylaminopropyl)-Trimethoxysilane | | | | | 1 | | |
| 3-(Diethylamino)propyl trimethoxysilane | | | | | | 1 | |
| Total | 100.00 | 100.00 | 100.00 | 100.00 | 100.00 | 100.00 | |

-continued

| Ingredients | Examples | | | | | | | |
|---|---|---|---|---|---|---|---|---|
| | 119 | 120 | 121 | 122 | 123 | 124 | 125 | 126 |
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Ethylene Glycol | 10 | 10 | 10 | 10 | 10 | 10 | 10 | 10 |
| N-(Triethoxysilylpropyl)-O-Polyethyleneoxide Urethane | 1.9 | 1.9 | 1.9 | 1.9 | 1.9 | 1.9 | 1.9 | 1.9 |
| Trimethoxy(octadecyl) silane | 1 | | | | | | | |
| Isobutyl Trimethoxysilane | | 1 | | | | | | |
| Hexyltrimethoxysilane | | | 1 | | | | | |
| Decyltrimethoxysilane | | | | 1 | | | | |
| Isooctyltrimethoxysilane | | | | | 1 | | | |
| Hexadecyltrimethoxysilane | | | | | | 1 | | |
| Propyltrimethoxysilane | | | | | | | 1 | |
| Octyltriethoxysilane | | | | | | | | 1 |
| Total | 100.00 | 100.00 | 100.00 | 100.00 | 100.00 | 100.00 | 100.00 | 100.00 |

| Ingredients | Examples | | | | | | | |
|---|---|---|---|---|---|---|---|---|
| | 127 | 128 | 129 | 130 | 131 | 132 | 133 | 134 |
| ST-O25 | 76 | 76 | 78 | 74 | 76 | 76 | 76 | 76 |
| Deionized water | 11.1 | 9.1 | 9.1 | 12.1 | 11.1 | 11.1 | 11.1 | 11.1 |
| Ethylene Glycol | 10 | 12 | 10 | 10 | 10 | 10 | 10 | 10 |
| 3-(Triethoxysilyl)propyl Succinic Anhydride | | 1.45 | | | | | | |
| N-(Triethoxysilylpropyl)-O-Polyethyleneoxide Urethane | 1.45 | | | | | | | |
| Silane, trimethoxy[3-(oxiranyl methoxy)propyl | 1.45 | 1.45 | 1.9 | 1.9 | | | | |
| 3-Ureidopropyl Triethoxysilane | 1.45 | 1.45 | | | 1.9 | | | |
| 2-(3,4 Epoxycyclohexyl)-ethyltrimethoxysilane | 1.45 | 1 | | | | 1.9 | | |

-continued

| Ingredients | |
|---|---|
| 3-(Trimethoxysilyl)propyl Methacrylate | 1.45 |
| Hexamethyl Disiloxane | 1 |
| Hexamethyl Disilazane | 1 |
| Total | 100.00 |

| Ingredients | Examples | | | | | | |
|---|---|---|---|---|---|---|---|
| | 135 | 136 | 137 | 138 | 139 | 140 | 141 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| Silane, trimethoxy[3-(oxiranyl methoxy)propyl | 1.9 | 1.9 | 1.9 | 1.9 | 1.9 | 1.9 | 1.9 |
| Trimethoxy Methyl Silane | 1 | | | | | | |
| Trimethoxy Phenyl Silane | | 1 | | | | | |
| Vinyl Trimethoxysilane | | | 1 | | | | |
| 3-(N,N-Dimethylaminopropyl)-Trimethoxysilane | | | | 1 | | | |
| 3-(Diethylamino)propyl trimethoxysilane | | | | | 1 | | |
| Trimethoxy(octadecyl)silane | | | | | | 1 | |
| Isobutyl Trimethoxysilane | | | | | | | 1 |
| Total | 100.00 | 100.00 | 100.00 | 100.00 | 100.00 | 100.00 | 100.00 |

| Ingredients | Examples | | | | | | |
|---|---|---|---|---|---|---|---|
| | 142 | 143 | 144 | 145 | 146 | 147 | |
| ST-O25 | 76 | 76 | 76 | 76 | 76 | 76 | |
| Deionized water | 11.1 | 11.1 | 11.1 | 11.1 | 11.1 | 11.1 | |
| Ethylene Glycol | 10 | 10 | 10 | 10 | 10 | 10 | |
| Silane, trimethoxy[3-(oxiranyl methoxy)propyl | 1.9 | 1.9 | 1.9 | 1.9 | 1.9 | 1.9 | |
| Hexyltrimethoxysilane | 1 | | | | | | |
| Decyltrimethoxysilane | | 1 | | | | | |
| Isooctyltrimethoxysilane | | | 1 | | | | |
| Hexadecyltrimethoxysilane | | | | 1 | | | |
| Propyltrimethoxysilane | | | | | 1 | | |
| Octyltriethoxysilane | | | | | | 1 | |
| Total | 100.00 | 100.00 | 100.00 | 100.00 | 100.00 | 100.00 | |

-continued

| Ingredients | 148 | 149 | 150 | 151 | 152 | 153 | 154 |
|---|---|---|---|---|---|---|---|
| ST-O25 | 76 | 76 | 76 | 76 | 76 | 76 | 76 |
| Deionized water | 6.1 | 7.1 | 8.1 | 9.1 | 11.1 | 11.1 | 11.1 |
| Ethylene Glycol | 15 | 14 | 13 | 12 | 10 | 10 | 10 |
| 3-(Triethoxysilyl)propyl Succinic Anhydride | 2.9 | | | | | | |
| N-(Triethoxysilylpropyl)-O-Polyethyleneoxide Urethane | | 2.9 | | | | | |
| Silane, trimethoxy[3-(oxiranyl methoxy)propyl | | | 2.9 | | | | |
| 3-Ureidopropyl Triethoxysilane | | | | 2.9 | | | |
| 2-(3,4 epoxycyclohexyl)-ethyltrimethoxysilane | | | | | 1.9 | 1.9 | 1.9 |
| 3-(Trimethoxysilyl)propyl Methacrylate | | | | | 1 | | |
| Hexamethyl Disiloxane | | | | | | 1 | 1 |
| Total | 100.00 | 100.00 | 100.00 | 100.00 | 100.00 | 100.00 | 100.00 |

| Ingredients | 155 | 156 | 157 | 158 | 159 | 160 | 161 |
|---|---|---|---|---|---|---|---|
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| Triethoxysilane | 1.9 | 1.9 | 1.9 | 1.9 | 1.9 | 1.9 | 1.9 |
| 3-Ureidopropyl Triethoxysilane | 1 | | | | | | |
| Hexamethyl Disilazane | | 1 | | | | | |
| Trimethoxy Methyl Silane | | | 1 | | | | |
| Trimethoxy Phenyl Silane | | | | 1 | | | |
| Vinyl Trimethoxysilane | | | | | 1 | | |
| 3-(N,N-Dimethylaminopropyl)-Trimethoxysilane | | | | | | 1 | |
| 3-(Diethylamino)propyl trimethoxysilane | | | | | | | 1 |
| Trimethoxy(octadecyl)silane | | | | | | | |
| Total | 100.00 | 100.00 | 100.00 | 100.00 | 100.00 | 100.00 | 100.00 |

-continued

| Ingredients | Examples | | | | | | |
|---|---|---|---|---|---|---|---|
| | 162 | 163 | 164 | 165 | 166 | 167 | 168 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| 3-Ureidopropyl Triethoxysilane | 1.9 | 1.9 | 1.9 | 1.9 | 1.9 | 1.9 | 1.9 |
| Isobutyl Trimethoxysilane | 1 | | | | | | |
| Hexyltrimethoxysilane | | 1 | | | | | |
| Decyltrimethoxysilane | | | 1 | | | | |
| Isooctyltrimethoxysilane | | | | 1 | | | |
| Hexadecyltrimethoxysilane | | | | | 1 | | |
| Propyltrimethoxysilane | | | | | | 1 | |
| Octyltriethoxysilane | | | | | | | 1 |
| Total | 100.00 | 100.00 | 100.00 | 100.00 | 100.00 | 100.00 | 100.00 |

| Ingredients | Description | Examples | | | | | | |
|---|---|---|---|---|---|---|---|---|
| | | 169 | 170 | 171 | 172 | 173 | 174 | 175 |
| ST-O-25 | Colloidal silica 25 wt % silica solids available from Nissan Chemical America | 52.68 | | 50 | | 51 | | 25 |
| ST-32C | Alkaline Colloidal Silica from Nissan Chemical Company, Japan | | 59.28 | | 48 | | 45 | 25 |
| Deionized water | | 36.05 | 27.97 | 40 | 41.5 | 38.5 | 43 | 35 |
| Propylene Glycol | | | | | 8 | 7.5 | 8.5 | |
| Ethylene Glycol | | 8.06 | 9.85 | 7.5 | | | | 10 |
| Silane, trimethoxy[3-(oxiranyl methoxy)propyl | | 3.21 | 2.9 | 2.5 | 2.5 | 3 | 3.5 | 5 |
| Total (g) | | 100 | 100 | 100 | 100 | 100 | 100 | 100 |

Brine resistant silica sols and hydrocarbon recovery fluids comprising surface functionalized nanoparticles, where the surface functionalized nanoparticles are brine resistant silica sols, can be found in U.S. patent application Ser. No. 15/946,252; filed Apr. 5, 2018, entitled "Brine Resistant Silica Sols"; U.S. patent application Ser. No. 15/946,338, filed Apr. 5, 2018, entitled "Hydrocarbon Formation Treatment Micellar Solutions"; U.S. patent application Ser. No. 14/129,688; filed: Sep. 12, 2018, entitled "Crude Oil Recovery Chemical Fluids", which application claims priority to Japanese Patent Application No. JP 2017-175511; and U.S. patent application Ser. No. 14/129,705; filed: Sep. 12, 2018, entitled "Crude Oil Recovery Chemical Fluid", which application claims priority to Japanese Patent Application No. JP 2017-175511; wherein all US Patent Applications are herein incorporated by reference, in their entirety.

When selecting/using a fluid to be used in the treatment of an oil and/or gas well, it is important for the fluid to have the right combination of additives and components to achieve the necessary characteristics of the specific end-use application. A primary goal amongst many aspects of hydrocarbon formation treatment is to optimize recovery of oil and/or gas from the formation. However, in part because the fluids utilized during the operation of an oil and/or gas well are often utilized to perform a number of tasks simultaneously, achieving necessary to optimal characteristics of the Hydrocarbon Recovery Fluid comprising surface functionalized nanoparticles is always challenging.

Additional commercially available compositions suitable for the Hydrocarbon Recovery Fluid include the nanoActiv® HRT product line available from Nissan Chemical America Corporation, located at 10333 Richmond Avenue, Suite 1100 Houston, Tex. 77042. These products, including developmental products that are currently being trialed, use nanosized particles in a colloidal dispersion, which allows the fluid to work by causing a Brownian-motion, diffusion-driven mechanism known as disjoining pressure to produce long efficacy in the recovery of hydrocarbons in conventional and unconventional reservoirs.

Current commercially available nanoActiv®HRT products, include, but are not limited to:
 a. HRT BIO/G—am environmentally friendly version
 b. OFS CORR PRO—a version containing a sour gas scavenger for reducing corrosion of iron piping due to $H_2S$
 c. HRT-78—a version formulated for high temperatures
 d. CPD-60—a version containing a hydroxysultaine surfactant
 e. CPD-37—the original version that was first sold
 f. HRT-53—economical, high performing commercial product
 g. HRT-53 C—another version of HRT-53C with a more dilute composition Additional Hydrocarbon Recovery Fluids comprising functionalized colloidal silica mixtures suitable for this invention include a crude oil recovery chemical solution which is excellent in resistance to high temperature and salt, characterized by containing a silane compound, an aqueous silica sol having an average particle size of from about 3 nm to about 200 nm.

In an embodiment of the Hydrocarbon Recovery Fluid comprising surface functionalized nanoparticles, the aqueous silica sol contains silica particles in which at least a part of the silane compound is bonded on the surface of at least a part of the silica particles in the sol.

In another embodiment of the Hydrocarbon Recovery Fluid comprising surface functionalized nanoparticles, the silane compound is at least one compound selected from the group consisting of a silane coupling agent having at least one organic functional group selected from the group consisting of a vinyl group, an ether group, an epoxy group, a styryl group, a methacryl group, an acryl group, an amino group and an isocyanurate group, an alkoxysilane group, a silazane group and a siloxane group.

In another embodiment of the Hydrocarbon Recovery Fluid comprising surface functionalized nanoparticles, aqueous silica sol is present in an amount of from about 0.1% by mass to about 20% by mass, based on the total mass of the crude oil recovery chemical solution, in terms of silica solid content.

In another embodiment of the Hydrocarbon Recovery Fluid comprising surface functionalized nanoparticles, the silane compound is present in a ratio of 0.1 to 3.0 of silane compound based on the mass of silica solid content of the aqueous silica sol.

In another embodiment of the Hydrocarbon Recovery Fluid comprising surface functionalized nanoparticles, the surfactants are present in an amount of from about 2% by mass to about 50% by mass, based on the total mass of the crude oil recovery chemical solution.

Additional Hydrocarbon Recovery Fluids comprising containing surface functionalized colloidal silica mixtures suitable for this invention include a micellar dispersion fluid comprising:

(a) a terpene-based oil phase that includes less than about 20.0 wt. % d-limonene, (b) one or more surfactants selected from the group consisting of anionic surfactants, cationic surfactants, nonionic surfactants and amphoteric surfactants;

(c) an alcohol selected from the group consisting of $C_1$-$C_8$ alcohols, such as, but not limited to ethylene glycol and isopropanol;

(d) an alcohol cosolvent, such as, but not limited to, ethyl-hexyl alcohols;

(e) water; and (f) a functionalized aqueous colloidal silica, which must be a brine resistant surface functionalized colloidal silica.

In another embodiment of a Hydrocarbon Recovery Fluid, which is a Micellar Dispersion, the Hydrocarbon Recovery Fluid comprises surface functionalized nanoparticles, the fluid comprises:

(a) an oil fluid that is not a terpene, (b) one or more surfactants selected from the group consisting of anionic surfactants, cationic surfactants, nonionic surfactants and amphoteric surfactants;

(c) an alcohol selected from the group consisting of $C_1$-$C_8$ alcohols; such as, but not limited to ethylene glycol and isopropanol;

(d) an alcohol cosolvent; such as, but not limited to, ethyl-hexyl alcohols;

(e) water; and (f) a functionalized aqueous colloidal silica, which must be a brine resistant surface functionalized colloidal silica.

Examples of potentially suitable Hydrocarbon Recovery Fluids comprising brine resistant silica sols are in the following tables.

| Supplier | Chemistry | Ingredients | Examples A | B | C | D |
|---|---|---|---|---|---|---|
| NCAC | Any of Examples 1-175 | Surface Treated Silicasol | 79.00 | 84.50 | 84.00 | 84.00 |
|  |  | NaOH (1%) | 10.00 | 10.00 | 9.00 | 9.50 |
| Akzo Nobel | Nonionic | Ethylan 1206 | 0.40 | 0.40 | 0.40 | 0.40 |
| Stepan | Nonionic | BioSoft N91-6 | 0.50 | 0.50 | 1.00 | 1.00 |
| Stepan | Alkyl Olefin Sulfonate | BioTerge AS-40 | 5.5 |  |  |  |
| Stepan | Cocamidopropyl Sultaine | Petrostep SB | 4.60 | 4.60 |  |  |
| Stepan | Lauramidopropyl Betaine | Amphosol LB |  |  | 5.60 |  |
| Stepan | Cocamidopropyl Betaine | PetroStep CG-50 |  |  |  | 5.10 |
|  |  | Total | 100.00 | 100.00 | 100.00 | 100.00 |

| Supplier | Chemistry | Ingredients | Examples E | F | G | H |
|---|---|---|---|---|---|---|
| NCAC | Any of Examples 1-175 | Surface Treated Silicasol | 84.90 | 84.60 | 83.6 | 83.00 |
|  |  | NaOH (1%) | 10.00 | 10.00 | 10 | 9.50 |
| Akzo Nobel | Nonionic | Ethylan 1206 | 0.40 | 0.40 | 0.4 |  |
| Evonik | Nonionic | Surfynol 420 |  |  |  | 0.50 |
| Stepan | Nonionic | BioSoft N91-6 | 1.00 | 1.00 | 1.00 | 1.00 |
| Stepan | Alkyl Olefin Sulfonate | BioTerge AS-40 |  |  | 5 | 6.00 |
| Stepan | Blended Betaine | PetroStep MME 50 | 3.70 |  |  |  |
| Stepan | Sodium Trideceth Sulfate | Cedepal TD 407 |  | 4.00 |  |  |
|  |  | Total | 100.00 | 100.00 | 100.00 | 100.00 |

| Supplier | Chemistry | Ingredients | Examples I | J | K | L |
|---|---|---|---|---|---|---|
| NCAC | Any of Examples 1-175 | Surface Treated Silicasol | 84.00 | 84.00 | 84.00 | 84.00 |
|  |  | NaOH (1%) | 10.00 | 10.00 | 10.00 | 10.00 |
| Stepan | Nonionic | BioSoft N91-6 | 0.50 | 1.00 | 1.00 | 1.00 |
| Stepan | Alkyl Olefin Sulfonate | BioTerge AS-40 | 5.5 |  |  |  |
| Croda | Ethoxylated Castor Oil | Etocas 200 SO MV |  | 5.00 |  |  |
| Croda | Ethoxylated Castor Oil | Etocas 29 LQ RB |  |  | 5.00 |  |
| Croda | Ethoxylated Castor Oil | Etocas 35 LQ MH |  |  |  | 5.00 |
|  |  | Total | 100.00 | 100.00 | 100.00 | 100.00 |

| Supplier | Chemistry | Ingredients | Examples M | N | O |
|---|---|---|---|---|---|
| NCAC | Any of Examples 1-175 | Surface Treated Silicasol | 84.00 | 84.00 | 84.00 |
|  |  | NaOH (1%) | 10.00 | 10.00 | 10.00 |
| Evonik | Nonionic | Surfynol 420 |  | 5 |  |
| Stepan | Nonionic | BioSoft N91-6 | 1.00 | 1.00 | 1.00 |
| Stepan | Alkyl Olefin Sulfonate | BioTerge AS-40 |  |  | 5.00 |
|  |  | Total | 100.00 | 100.00 | 100.00 |

| Supplier | Ingredients | Examples P | Q | R | S | T | U | V | W |
|---|---|---|---|---|---|---|---|---|---|
| Brine Resistant Silica Sol made from ST-32C available from Nissan Chemical Corporation Ltd. | Surface Treated Silicasol | 21 | 20.5 | 16.5 | 14.4 |  |  |  |  |

-continued

| | | | | | | | | | |
|---|---|---|---|---|---|---|---|---|---|
| Brine Resistant Silica Sol made from ST-O25 available from Nissan Chemical America Corporation | Surface Treated Silicasol | | | | 42 | 37.4 | 33.5 | 29.4 |
| Dipentene (oil phase) available from Vertec Biosolvents | VertecBio DLR | 0.5 | 1.05 | 1 | 1.1 | 0.5 | 1.05 | 1 | 1.1 |
| Methyl Soyate (oil phase) | VertecBio Gold | 11 | 11.5 | 12 | 12.5 | 11 | 11.5 | 12 | 12.5 |
| Water | Any Source | 9 | 6 | 7 | 8 | 9 | 8 | 7 | 6 |
| Isopropanol | Any Supplier | 10 | 11 | 12 | 13 | 13 | 12 | 11 | 10 |
| Alkyl Olefin Sulfonate, 40% Actives available from Solvay | AOS-40 | 39 | 40 | 41 | 40 | 15 | 20 | 25 | 30 |
| Nonionic surfactant available from AkzoNobel | Ethylan 1206 | 9.5 | 10 | 10.5 | 11 | 9.5 | 10 | 10.5 | 11 |
| | Total | 100 | 100 | 100 | 100 | 100 | 100 | 100 | 100 |

The gas is selected from the group consisting of carbon dioxide, nitrogen, natural gas, liquified natural gas, liquified carbon dioxide and/or mixtures thereof. The motility of the gas is used to distribute the nanoparticles more effectively and push them deeper into the formation, allowing the gas and nanoparticles to maximize their production enhancement capabilities. Successful treatment enhances production for six months or more thanks to the effective penetration and residual value of the nanoparticles. This process is extremely flexible and can therefore be used with all types of wells, including conventional, unconventional and oil and gas wells.

The first generation of nanoActiv® HRT nanoparticles are designed specifically to be used in combination with carbon dioxide, nitrogen, natural gas, liquified natural gas, liquified carbon dioxide and/or mixtures thereof. The first generation of nanoActiv® HRT is not designed to work well with Steam. Steam is not required or desirable to be used in combination with the first generation of nanoActiv® HRT patent pending technology. Steam remains a potential gas for use in combination with future generations of Hydrocarbon Recovery Fluids comprising surface functionalized nanoparticle products.

The gas itself delivers a range of benefits, for example:
Stimulating the well with pressure, mobilizing oil or gas to the wellbore;
Removing debris, fines and other matter (removing the well skin);
Swelling and reducing the viscosity of the oil, facilitating mobilization of oil when miscible;
Displacing oil or gas in the reservoir, mobilizing to the wellbore; and
Altering wettability characteristics, removing fluids causing blockages near the wellbore area by changing their wettability to a more neutral wet state.

RECHARGE HNP™ is the tradename for a prescribed, simple, flexible remediation treatment for wells consisting of the three Huff' n Puff phases: injection, soaking and production. Thanks to the synergies between the developmental nanoActiv® Hydrocarbon Recovery Fluids comprising surface functionalized nanoparticle products and the gas, the soak times can be dramatically reduced compared with traditional HNP treatments. Depending on the type of formation, well history and identified issues, a specific treatment plan is prescribed.

RECHARGE HNP™ treatment comprises a three-phase process of
1) screening the well candidates,
2) specifying and prescribing the treatment, and
3) implementing the treatment.

This also includes monitoring post-treatment production up to 180 days to determine the most suitable next-stage treatment. Wells must be screened and analyzed to ensure the correct treatment is applied. This is vital to ensuring the treatment has the desired effect on productivity. Table α following highlights the current screening criteria:

TABLE α

Well screening criteria for RECHARGE HNP ™

| | |
|---|---|
| Production | Good initial production (IP) with gradual decline curve that indicates continuous well depletion, wettability issues<br>Current production <10-20% of IP and preferably >5-10 BOPD or 20 mscfd |
| Field data | Well performance should be on par with other wells in the field; thief zones and extensive fractures need to be understood |
| Treatments | Acid and other chemical treatments may negatively impact properties of nanoActiv ® |
| Well equipment | To be in good mechanical condition. Pumps, linings, gaskets. Ensure pressure tested or assurance for pressure treating levels. |
| Water | Too high content of salts (e.g. KOI) and TDS may negatively impact nanoActiv ® |
| Water cut | <80% (N2), <90% (CO2) ideal, may go higher with greater treatment dosages |
| Net Pay Zone | <100 ft (30 m) vertical to optimize 60-90 days pay-back. |
| Porosity | Porosity/>8% conventional, >4% unconventional |
| Oil | Oil gravity <30 API, $CO_2$ preferred<br>Avoid asphaltenes precipitation conditions |

EXAMPLE

This example describes work done in combining nitrogen and a developmental nanoActiv® Hydrocarbon Recovery Fluid product comprising brine resistant silicasol nanoparticles, sodium hydroxide, one anionic surfactant and one nonionic surfactant in the Austin Chalk and Buda formations.

This case study focuses on a number of aged, depleted wells (some shut-in) in the Buda and Austin Chalk formations in Central Texas (USA). These wells are horizontal open-hole completions. Prior to this work, the operator of the wells initially injected small amounts of $N_2$ into each well (60 tons per well) to try to improve productivity.

A developmental nanoActiv® Hydrocarbon Recovery Fluid product previously described is used in combination with nitrogen as a way of achieving better, longer-lasting results.

The process for treatment of each well is as follows:
1) A fresh water pill is introduced to the well formation,
2) The developmental nanoActiv® Hydrocarbon Recovery Fluid is introduced into the well formation,
3) then nitrogen is introduced into the well formation,
4) Steps 2) and 3) are repeated in sequence at least four more times.

Field Treatment Program

Five wells are treated with various amounts of developmental nanoActiv® Hydrocarbon Recovery Fluid comprising surface functionalized nanoparticles along with a constant volume of 60 tons of Nitrogen per well.

The well candidates, Nitrogen volumes and stages of injection are chosen by the operator.

The following is a summary of the well treatment for each of the identified wells:

Buda Well A—totals: 500 gallons fresh water pill, 2500 gallons developmental nanoActiv®, 60 tons Nitrogen Buda Well B—totals: 500 gallons fresh water pill, 2500 gallons developmental nanoActiv®, 60 tons Nitrogen Buda Well C—totals: 500 gallons fresh water pill, 3000 gallons developmental nanoActiv®, 60 tons Nitrogen Austin Chalk Well A—totals: 500 gallons fresh water pill, 7500 gallons developmental nanoActiv®, 60 tons Nitrogen Austin Chalk Well B—totals: 500 gallons fresh water pill, 7500 gallons developmental nanoActiv®, 60 tons Nitrogen After monitoring productivity for 180 days after treatment and thoroughly analyzing the production results, several observations are recorded. All five wells respond to the treatment. Looking at the dosage of treatment relative to the treatment area, there is a direct, one-to-one correlation between dosage and treatment response. The areas that receive the higher doses of gas and nanoparticles produce better results.

Figure 4:
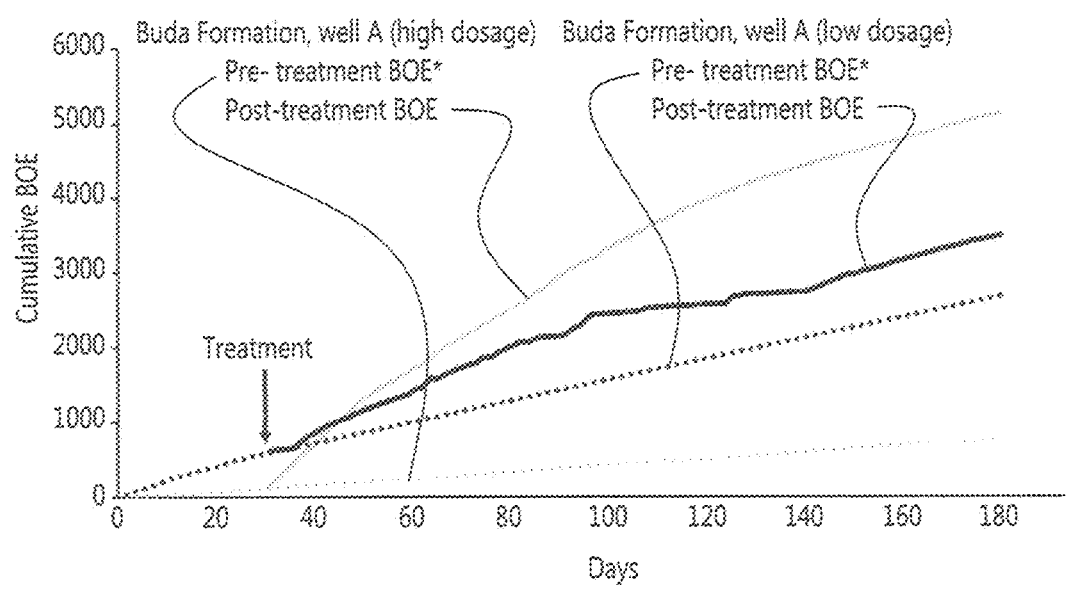
FIG. 4. Cumulative oil production for the Austin Chalk wells before and after treatment with $N_2$ and developmental nanoActiv® HRT Hydrocarbon Recovery Fluid comprising surface functionalized nanoparticles.
Figure 5:
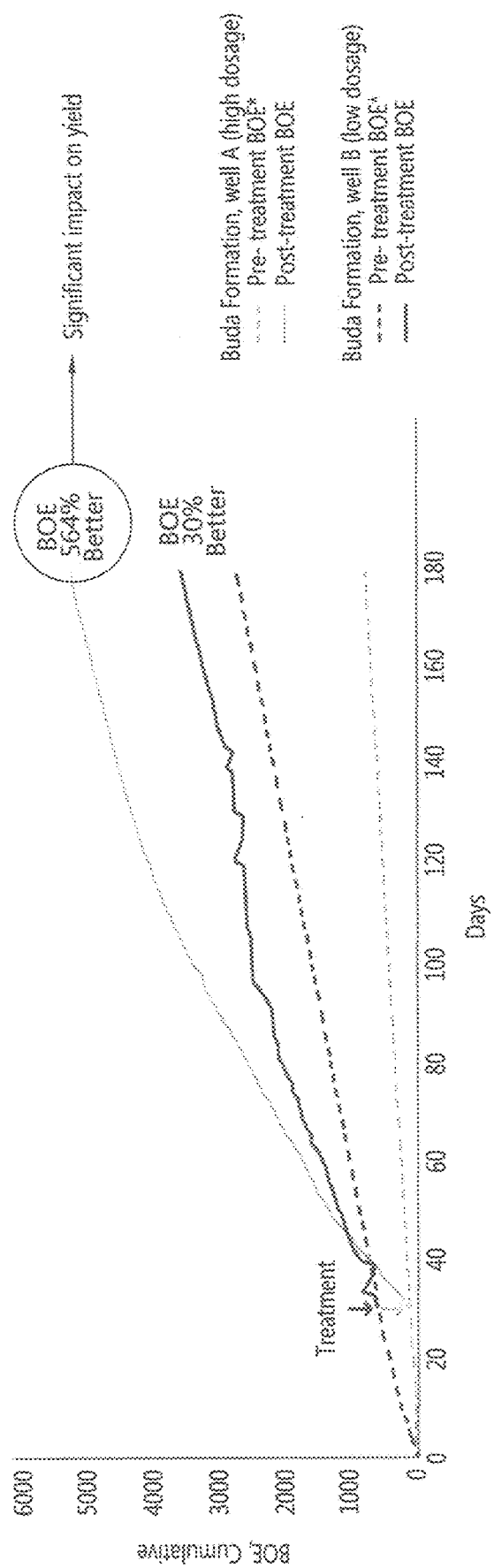
FIG. 5. Cumulative BOE production at the Buda wells before and after treatment with $N_2$ and developmental nanoActiv® HRT Hydrocarbon Recovery Fluid comprising surface functionalized nanoparticles.
Figure 6:
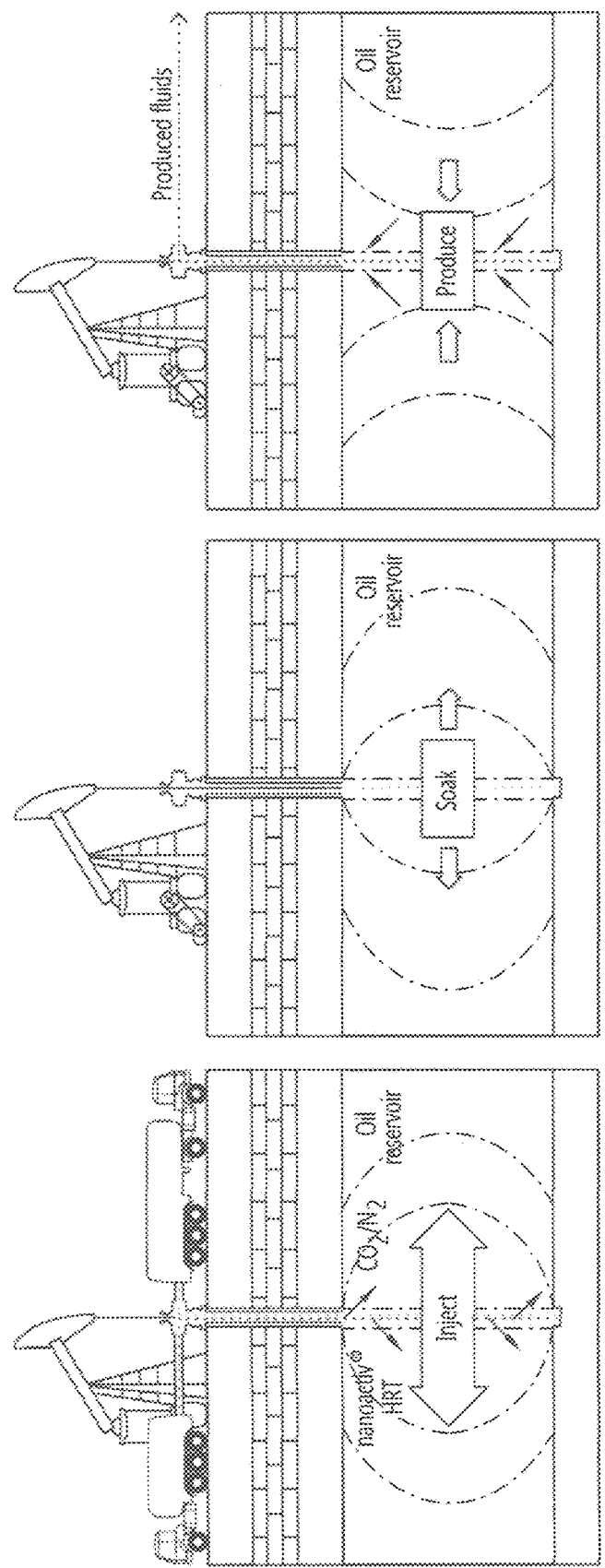
FIG. 6. The three phases of an HNP™ treatment.

The responses of four of the five wells, two in Austin Chalk and two in Buda, are shown in FIGS. 4 and 5. The fifth well receives the lowest treatment dosage (45 percent lower than the highest dosage) and initially the only response observed on this well is excess water removal. After approximately 160 days of production and excess water removal, a 20 percent uptick in average daily oil production is recorded.

In addition to the direct correlation between the dosage applied to the wells and their responses (improvement in hydrocarbon production expressed as a percentage), there is also a direct correlation between the dosage and the duration of the treatment response. This can be seen in Table β.

TABLE β

Correlation between the treatment dosage Nitrogen and developmental nanoActv ® Hydrocarbon Recovery Fluid comprising surface functionalized nanoparticles) in the Austin Chalk and Buda wells and the well production response and the duration of the response.
High Correlation Between Dosage and Yield

| | Treatment production response (days) | Dosage of treatment (ranking) | Well response (ranking) |
|---|---|---|---|
| Buda, Well A | 90 | 3 | 4 |
| Buda, Well B | 180 | 1 | 1 |
| Austin Chalk, Well A | 90 | 4 | 3 |
| Austin Chalk, Well B | 180 | 2 | 2 |

RECHARGE HNP™ is a multi-spectrum, proprietary remediation treatment for wells with a range of production problems. Combining the properties of gas and nanoparticles creates a unique, synergistic treatment that addresses several potential production issues simultaneously, while being less cost-intensive than alternative solutions. The extended scope is extremely useful because wells often experience a combination of issues that lead to a decline in productivity or, in many cases, operators do not know the full extent of the downhole problems.

Successful treatments enhance production by six months or more, thus reducing periodicity of repeated treatments. RECHARGE HNP™ is highly flexible and easy to implement: it can be used with all types of wells, including conventional, unconventional and oil and gas wells.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. All patents, patent applications, and references cited anywhere in this disclosure are incorporated by reference in their entirety.

What is claimed:

1. A process of stimulating hydrocarbon recovery comprising
   (a) introducing a gas, a liquefied gas or vaporized liquefied gas into an underground formation containing hydrocarbons;
   (b) permitting said gas, liquefied gas or vaporized liquefied gas to be absorbed by said hydrocarbons;
   (c) withdrawing said hydrocarbons containing said gas, liquefied gas or vaporized liquefied gas absorbed therein; and
   (d) inserting a pill of hydrocarbon recovery fluid comprising an aqueous silica sol comprising surface functionalized nanoparticles into the underground formation, before the introduction of the gas, liquefied gas or vaporized liquefied gas, wherein said surface functionalized nanoparticles are brine resistant silica sol nanoparticles surface functionalized with a silane compound having at least one organic functional group selected from the group consisting of a vinyl group, an ether group, an epoxy group, a styryl group, a methacryl group, an acryl group, an amino group, an isocyanurate group, an alkoxysilane group, a silazane group and a siloxane group, and wherein the surface functionalized nanoparticles alter wettability of solid/liquefied surfaces and facilitate flow of the hydrocarbons.

2. The process of claim 1 wherein the gas, liquefied gas or vaporized liquefied gas and the pill include one or more injectants selected from the group consisting of fresh water, potassium chloride water and diverters.

3. The process of claim 1 wherein said gas is selected from the group consisting of carbon dioxide, nitrogen, natural gas, and mixtures thereof.

4. The process of claim 3 wherein said gas is a mixture of two or more gases selected from the group consisting of carbon dioxide, nitrogen and natural gas.

5. The process of claim 3 wherein said process is part of a huff and puff treatment process.

6. The process of claim 5 wherein said process is a waterless fracturing process.

7. The process of claim 1 wherein the gas is introduced and said gas is carbon dioxide.

8. The process of claim 1 wherein the gas is introduced and said gas is nitrogen.

9. The process of claim 1 wherein the gas is introduced and said gas is natural gas.

10. The process of claim 1 wherein the liquefied gas is introduced and said liquefied gas is liquefied natural gas, liquefied carbon dioxide, or mixtures thereof.

11. The process of claim 1 wherein said hydrocarbon recovery fluid comprises:
sodium hydroxide,
one anionic surfactant, and
one nonionic surfactant.

12. The process of claim 1, wherein the underground formation is a conventional well with a porosity of greater than 8%.

13. The process of claim 1, wherein the underground formation is an unconventional well with a porosity of greater than 4%.

14. The process of claim 1, wherein the underground formation has an API oil gravity of less than 30.

* * * * *

UNITED STATES PATENT AND TRADEMARK OFFICE
CERTIFICATE OF CORRECTION

PATENT NO. : 10,801,310 B2
APPLICATION NO. : 16/141824
DATED : October 13, 2020
INVENTOR(S) : Robin Watts et al.

It is certified that error appears in the above-identified patent and that said Letters Patent is hereby corrected as shown below:

In the Specification

Column 1, Line 41:
"flow velocity[1]"
Should be:
-- flow velocity --

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*